(12) United States Patent
Ito

(10) Patent No.: US 7,250,968 B2
(45) Date of Patent: Jul. 31, 2007

(54) INFORMATION RECORDING DEVICE IMPLEMENTING AN ELECTRONIC ZOOM HAVING A LIMITING SECTION

(75) Inventor: Takeyoshi Ito, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 849 days.

(21) Appl. No.: 10/384,655

(22) Filed: Mar. 11, 2003

(65) Prior Publication Data

US 2003/0174220 A1    Sep. 18, 2003

(30) Foreign Application Priority Data

Mar. 12, 2002   (JP)  ............................. 2002-066976

(51) Int. Cl.
*H04N 5/262*  (2006.01)
*H04N 5/222*  (2006.01)

(52) U.S. Cl. ..................... 348/240.2; 348/333.12; 348/333.02

(58) Field of Classification Search ............. 348/240.2, 348/240.99, 333.12
See application file for complete search history.

(56) References Cited

U.S. PATENT DOCUMENTS

| | | | | |
|---|---|---|---|---|
| 5,838,371 A | * | 11/1998 | Hirose et al. ............. | 348/240.2 |
| 6,330,400 B1 | * | 12/2001 | Bittner et al. ................. | 396/72 |
| 6,335,760 B1 | * | 1/2002 | Sato ......................... | 348/397.1 |
| 6,668,134 B1 | * | 12/2003 | Niikawa ...................... | 386/95 |
| 7,012,641 B2 | * | 3/2006 | Kawabe ................... | 348/240.2 |
| 7,161,618 B1 | * | 1/2007 | Niikawa et al. .......... | 348/207.1 |

\* cited by examiner

*Primary Examiner*—Ngoc-Yen Vu
*Assistant Examiner*—Adam L. Henderson
(74) *Attorney, Agent, or Firm*—Birch, Stewart, Kolasch & Birch, LLP

(57) ABSTRACT

An information recording device capable of preventing a deterioration of quality of a display image. Pixel counts in each of a horizontal direction and a vertical direction of an image represented by digital image data generated by a CCD, are greater than in an image for which electronic zoom has been implemented. A zoom rate of the electronic zoom to be applied to the image during execution of dubbing of an image file and/or display by an LCD of an image represented by the image file, is limited to not more than a magnification rate upper limit value, which is determined on the basis of the horizontal and vertical direction pixel counts of the image represented by the digital image data generated by the CCD and pixel counts in the horizontal and vertical directions of the image for which the electron zoom has been implemented.

16 Claims, 13 Drawing Sheets

FIG. 10

DISPLAY SECTION 84

DUBBING IMAGE SELECTION

CHOOSE A FILENAME FOR DUBBING:

aaa.jpg
    bbb.jpg
    xxx.avi
    yyy.avi
    zzz.avi
       :

FIG. 12

LCD50

PLAYBACK IMAGE SELECTION

CHOOSE A FILENAME FOR PLAYBACK:

aaa. jpg
bbb. jpg
xxx. avi
yyy. avi
zzz. avi
⋮

F I G . 13
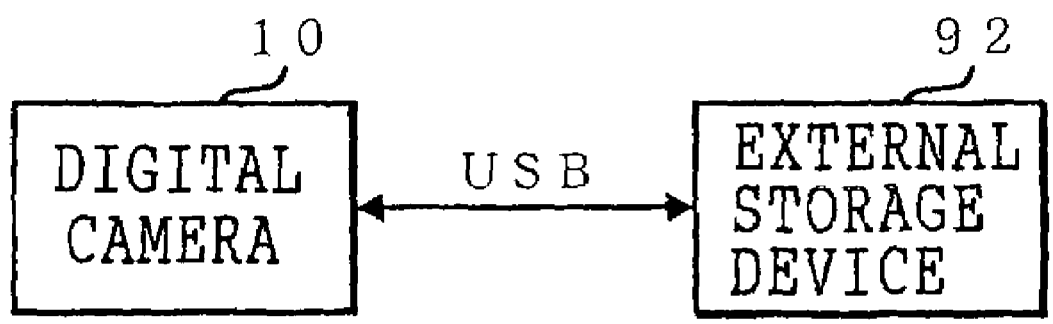

INFORMATION RECORDING DEVICE IMPLEMENTING AN ELECTRONIC ZOOM HAVING A LIMITING SECTION

BACKGROUND OF THE INVENTION

1. Field of the Invention

The present invention relates to an information recording device, and particularly to an information recording device which records image information obtained by image capture.

2. Description of the Related Art

Heretofore, there have been digital cameras, such as digital still cameras, digital video cameras and the like that are equipped with display sections such as liquid crystal displays and the like, which digital cameras are capable of magnifying and diminishing images which are represented by image data recorded by photography by electronic zooming and of displaying the magnified/diminished images at the display sections.

However, in this type of digital camera, when an image is magnified for display by the electronic zoom, in a case in which a number of pixels that structure an image region to be magnified is smaller than a number of pixels of the display section, that is, than a number of pixels after magnification, image data for pixels that are not actually present is generated by interpolation. Consequently, there is a problem in that as the magnification rate becomes large, quality of the displayed image deteriorates.

Further, for this type of digital camera, a technique of enlarging or reducing an image represented by image data by electronic zoom has been considered in which the technique of magnifying or diminishing the display image by electronic zoom is applied when image data recorded by photography is dubbed (duplicated). However, in this technique too, the problem that quality of an image represented by the image data obtained by dubbing deteriorates as the magnification rate becomes large occurs.

SUMMARY OF THE INVENTION

The present invention is provided to solve the above-described problem and an object of the present invention is to provide an information recording device which can prevent a deterioration in image quality of a display image.

In order to achieve the object described above, an information recording device of a first aspect of the present invention includes: an imaging section which captures an image and generates image information; a recording section which records the image information generated by the imaging section; a display section which displays an image represented by the image information recorded at the recording section; a zoom information input section which, when electronic zoom is to be applied to the image during execution of at least one of duplication of the image information and display of the image information by the display section, inputs zoom information including at least ratio information representing a zoom rate of the electronic zoom; and a limiting section which limits such that pixel numbers in each of a horizontal direction and a vertical direction of an image represented by the image information generated by the imaging section are greater than pixel numbers in the horizontal direction and the vertical direction of an image to which the electronic zoom has been applied, and such that the zoom ratio is not more than a magnification rate upper limit value, the magnification rate upper limit value being determined on the basis of the pixel numbers in the horizontal direction and the vertical direction of the image represented by the image information generated by the imaging section and the pixel numbers in the horizontal direction and the vertical direction of the image to which the electronic zoom has been applied.

According to the information recording device of the first aspect of the present invention, an image is imaged by the imaging section and image information is created. The created image information is recorded by the recording section. A removable recording medium such as a Smart Media (trade mark), a Compact Flash, an ATA (AT attachment) card, a Microdrive, a floppy disk, a CD-R (compact disc-recordable), a CD-RW (compact disc-rewritable), a magneto-optical disc, a magnetic tape or the like; a fixed recording medium such as a hard disk or the like; storage elements such as RAM (random access memory), EEPROM (electrically erasable and programmable read only memory), flash EEPROM or the like; or an external storage device or the like provided at a server computer or the like connected through a network can be used for the recording section.

In the present invention, when the image information recorded at the recording section is duplicated and/or an image represented by the image information is displayed by the display section, if electronic zoom is to be implemented for the image, zoom information including at least ratio information representing a zoom rate for the electronic zoom is inputted by the zoom information input section. The display section can include various displays, such as a liquid crystal display, a plasma display, an organic EL (electroluminescent) display, a cathode ray tube display or the like.

Now, in the present invention, numbers of pixels in each of the horizontal direction and the vertical direction of the image represented by the image information generated by the imaging section are greater than in the image on which electronic zoom has been implemented. Moreover, the zoom rate is limited by the limiting section so as to be less than or equal to the magnification rate upper limit value, which is determined on the basis of the numbers of pixels in each of the horizontal direction and the vertical direction of the image represented by the image information generated by the imaging section and the numbers of pixels in each of the horizontal direction and the vertical direction of the image on which electronic zoom has been implemented.

That is, as described above, when the image is magnified by electronic zoom and displayed, or duplication is carried out, if numbers of pixels that structure an image region before magnification are smaller than numbers of pixels after magnification, then it is necessary to create image data for pixels that are not actually existent, by interpolation. Hence, as the zoom rate becomes larger, the quality of the displayed image deteriorates.

Accordingly, in the present invention, by making the pixel numbers in each of the horizontal direction and the vertical direction of the image represented by the image information generated by the imaging section greater than the pixel numbers of the image after electronic zoom has been implemented, the numbers of pixels structuring the image region before magnification by the electronic zoom can be made to be greater than the numbers of pixels of the image after magnification. Moreover, because the zoom rate is limited so as not to exceed the magnification rate upper limit value, which is determined on the basis of the pixel numbers in the horizontal direction and the vertical direction of the image represented by the image information generated by the imaging section and the pixel numbers of in the horizontal direction and the vertical direction of the image on which electronic zoom has been implemented, the aforementioned deterioration of quality can be averted.

Here, if a value is obtained by dividing the horizontal direction pixel number of the image represented by the image information generated by the imaging means by the horizontal direction pixel number of the image after electronic zoom has been implemented, another value is obtained by dividing the vertical direction pixel number of the image represented by the image information generated by the imaging means by the vertical direction pixel number of the image after electronic zoom has been implemented, and a value that is the smaller of these values (the common value in a case of equality) is employed as the magnification rate upper limit value, then the electronic zoom-processed image information can be obtained simply by thinning out pixel units, without performing interpolation processing, and this is optimal.

However, in a case in which the pixel numbers of the image after electronic zoom processing are comparatively large, it may be possible to apply a small amount of pixel interpolation processing without greatly affecting the quality of the electronic zoom-processed image. In such a case, the magnification rate upper limit value may be set to a value slightly larger than the optimum value described above.

For example, if the pixel numbers in the horizontal direction and the vertical direction of the image represented by the image information generated by the imaging section are 1280 pixels and 960 pixels, respectively, and the pixel numbers in the horizontal direction and the vertical direction of the image after electronic zoom processing has been implemented are 640 pixels and 480 pixels, respectively, the above described optimal value of the magnification rate upper limit value is 2 (=1280/640=960/480). However, according to the results of investigations by the inventor of the present invention, in such a case, even if the magnification rate upper element value is set to around 2.5 (a 25% increase on the optimal value), deterioration of the image will not be visually noticeable. Therefore, in such a case, this value may be employed as the magnification rate upper limit value.

Images in the present embodiment include, besides still images, moving images. For a case in which an image of the present invention is a still image, obviously, ratio information inputted by the zoom information input means relates to that image. However, in a case in which an image of the present invention is a moving image, then the ratio information relates to a selection of images (maybe one image) of the moving image or to all images thereof. Accordingly, the limitation of the zoom rate by the limiting means in a case in which the image of the present invention is a moving image applies to all ratio informations inputted by the zoom information input section.

Thus, according to the information recording device of the first aspect of the present invention, the pixel numbers in the horizontal direction and the vertical direction of the image represented by the image information generated by the imaging section are greater than the pixel numbers of the image after the electronic zoom has been applied, and the zoom rate of the electronic zoom that is to be applied to the image at the time of execution of duplication of the image information and/or display by the display section of the image represented by the image information is limited so as to be less than or equal to the magnification rate upper limit value, which is determined on the basis of the pixel numbers in the horizontal direction and the vertical direction of the image represented by the image information generated by the imaging section and the pixel numbers in the horizontal direction and the vertical direction of the image after electronic zoom has been implemented. Consequently, the deterioration in quality of the display image can be prevented.

Conventionally, when a partial block of image information of a moving image is to be magnified or diminished by electronic zoom and dubbed (duplicated) using a moving image playback device and a recording device, serial operation is necessary. In this serial operation, the recording device is put into a recording standby state in advance, and the image information is replayed by the moving image playback device. The images being replayed are observed, and at a time when a scene at which dubbing is to commence is reached, the recording device is brought out from the recording standby state and recording is commenced. Thereafter, when a scene for which the application of electronic zoom processing is desired is being replayed, operations are carried out for executing electronic zoom processing at the moving image playback device. And at a time when a scene at which dubbing is to finish is reached, the recording device is again put into the recording standby state, and recording is ended. This operation is complicated and time-consuming.

Similarly, conventionally, when a partial block of image information of a moving image is to be magnified or diminished by electronic zoom and replayed using a moving image playback device, serial operation is necessary. In this serial operation, fast forward playback and/or fast rewind playback of the image information is carried out at the moving image playback device. The images being replayed are observed, and when a desired scene is found, commencement of playback at ordinary speed is commenced. And when a scene for which the application of electronic zoom processing is desired is being replayed, operations are carried out for executing this electronic zoom processing. This operation is complicated and time-consuming.

In consideration of these points, an information recording device of a second aspect of the present invention is the information recording device of the first aspect, wherein the image includes a moving image, and the zoom information input section includes: an editing operation section which inputs zoom information by being operated when, in a state in which the moving image is being displayed by the display section, an image is being displayed at the display section, at which image the electronic zoom is to be applied at a time of execution of at least one of duplication of the image information and display of the moving image by the display section on a subsequent occasion, the editing operation section also being operated, in the state in which the moving image is being displayed by the display portion, when an image is being displayed by the display section at which image the execution is to be commenced at the time of execution of at least one of duplication of the image information and display of the moving image by the display section on a subsequent occasion, and when an image is being displayed at the display section at which image the execution is to be terminated; and an information recording section which, on the basis of operation of the zoom information input section, records zoom position information indicating a position in the image information of the image at which the electronic zoom is to be applied and ratio information representing a zoom rate for that image, and which, on the basis of operation of the editing operation section, records editing commencement position information indicating a position in the image information of the image at which the execution is to be commenced and editing termination position information indicating a position in the image information of the image at which the execution is to be terminated.

According to the information recording device of the second aspect of the present invention, if the image relating to the present invention is a moving image, then, in the state in which the moving image is being displayed by the display section, when images for which the application of electronic zoom is desired at the time of execution of duplication of the image information and/or a subsequent display of the moving image by the display section are being displayed by the display section, the zoom information of the present invention is inputted by operation of the zoom information input section. The zoom information input section in this case can include various switches and buttons that can be operated by pushing operation, sliding operation, tilting operation or the like, as well as various sensors such as contact sensors and the like.

Further, in the invention of the second aspect of the present invention, in the state in which the moving image is being displayed by the display portion, when the image at which commencement of execution is desired at the time of execution of duplication of the image information and/or subsequent display of the moving image by the display section is being displayed by the display section, and when the image at which termination of this execution is desired is being displayed by the display section, the editing operation section is operated. Here, the editing operation section can include various switches and buttons that can be operated by pushing operation, sliding operation, tilting operation or the like, as well as various sensors such as contact sensors and the like.

Thus, in the present invention, the information recording section records, on the basis of operations on the zoom information input section, the zoom position information representing the position in the image information of an image to which the application of electronic zoom is desired and the ratio information representing a zoom rate for that image. Moreover, the information recording section records, on the basis of operations on the editing operation section, the editing commencement position information, which represents the position in the image information of the image at which the commencement of execution is desired, and the editing termination position information, which represents the position in the image information of the image at which the termination of execution is desired.

That is, with the present invention, in the state in which the moving image represented by the image information is being displayed by the display section, the displayed images are observed. At this time, if electronic zoom is to be implemented on the moving image during the execution of duplication and/or display by the display section on a subsequent occasion, the images for which electronic zoom is to be implemented are selected by operation of the zoom information input section. Moreover, the image that is to commence execution and the image that is to terminate execution, at the time of execution of duplication and/or subsequent playback by the display section, are selected by operation of the editing operation section. Thus, operation is simplified.

Further, in the present invention, for an image selected by operation of the zoom information input section, information representing the position of the image in the image information and information representing a zoom rate for the image are recorded. For the images selected by operation of the editing operation section, information representing their positions in the image information is recorded. Therefore, at the time of execution of duplication and/or subsequent playback by the display section, this recorded information is utilized for carrying out this execution, which is accompanied by electronic zoom processing. As a result, duplication and/or display of a partial block of the moving image information, together with electronic zoom processing, can be carried out in a short time.

Accordingly, according to the information recording device of the second aspect of the present invention, the same effects as in the first aspect can be achieved, and duplication and/or display of a partial block of image information of a moving image, accompanied by electronic zooming, can be carried out in a short time with simple operations.

Furthermore, an information recording device of a third aspect of the present invention is the second aspect of the present invention, further including a transmission section which, of the image information, transmits image information corresponding to each image from the image indicated by the editing commencement position information to the image indicated by the editing termination position information outside the device.

According to the information recording device of the third aspect of the present invention, the image information corresponding to each image in the image information, from the image indicated by the editing commencement position information to the image indicated by the editing termination position information, is transmitted to an external section by the transmitting section. Consequently, the image information transmitted by the transmission section is received at the external section, and hence duplication of this image information and/or display of the images represented by this image information can be executed thereat.

Transmissions from the transmission section may include, besides cable transmissions, wireless transmissions. The cable transmissions may include transmissions by USB (Universal Serial Bus) and transmissions by IEEE (Institute of Electrical and Electronics Engineers) 1394. The wireless transmissions may include transmissions using electromagnetic waves, such as BLUETOOTH or the like, and transmissions using infra-red rays, such as IrDA (Infrared Data Association) or the like.

Thus, according to the information recording device of the third aspect of the present invention, the same effects as in the second aspect can be achieved. Moreover, because the image information corresponding to each image, in the image information, from the image indicated by the editing commencement position information to the image indicated by the editing termination position information, is transmitted to the external section by the transmitting section, duplication of this image information and/or display of the images represented by this image information can be executed at the external section.

Furthermore, fourth, fifth and sixth aspects of the present invention are the first, second and third aspects of the present invention, respectively, further including a photographic zoom operation portion which, during execution of capture of the image by the imaging section, is operated when an image which is represented by the image information obtained by this capturing is to be magnified or diminished, wherein the zoom information input section and the photographic zoom operation portion are used in common.

In these structures, in a case in which the present invention is applied, for example, to a digital camera such as a digital still camera, a digital video camera or the like, the photographic zoom operation portion corresponds to a zoom button.

Further, in the fourth to sixth aspects of the present invention, the zoom information can be inputted in the same way as zoom operations during photography. Thus, operability can be improved, and costs that providing the zoom operation input section separately would require can be saved.

Thus, according to the fourth to sixth aspects of the present invention, operability of the first to third aspects may be improved, and costs may be reduced.

Seventh and eighth aspects of the present invention are the second and third aspects, respectively, further including a photography operation portion which is operated when an image is to be photographed, wherein the editing operation section and the photography operation portion are used in common.

In the seventh and eighth aspects of the present invention, in a case in which the present invention is applied, for example, to a digital camera such as a digital still camera, a digital video camera or the like, the photography operation portion corresponds to a release button (the "shutter").

With the seventh and eighth aspects of the present invention, the editing commencement position information and the editing termination position information can be recorded by operations the same as during moving image photography. Thus, operability can be improved, and costs that providing the editing operation section separately would require can be saved.

Thus, according to the seventh and eighth aspects of the present invention, the same effects as in the second and third aspects can be achieved, operability may be improved, and costs may be reduced.

Ninth, tenth and eleventh aspects of the present invention are the first, second and third aspects, respectively, further including: a cutting out section which, during execution of duplication of the image information, cuts out zoom region image information from the image information, the zoom region image information comprising image information of a region that is to be magnified or diminished by a zoom rate corresponding thereto; and a zoom execution section which carries out magnification or diminution on the zoom region image information at the corresponding zoom rate.

With the ninth to eleventh aspects of the present invention, when a device that creates a duplicate of the image information is an external device, a processing load on the external device can be reduced compared to a case in which the external device cuts out the zoom region image information and implements magnification processing or diminution processing on the image information that has been cut out.

Thus, according to the ninth to eleventh aspects of the present invention, the load of processing on an external device when the external device performs duplication of the image information may be reduced compared to the first to third aspects.

BRIEF DESCRIPTION OF THE DRAWINGS

FIG. 10 is a diagram showing a display state of a dubbing image selection menu relating to the embodiment of the present invention.

FIG. 12 is a view showing a display state of a playback image selection menu relating to the embodiment of the present invention.

FIG. 13 is a block diagram showing another embodiment of the present invention.

DETAILED DESCRIPTION OF THE PREFERRED EMBODIMENTS

Below, details of an embodiment of the present invention will be described with reference to the drawings. For the present embodiment, a case in which the information recording device of the present invention is applied to a digital camera will be described. First, external structure of a digital camera 10 relating to the present embodiment will be described with reference to FIG. 1A.

Figure 1A:
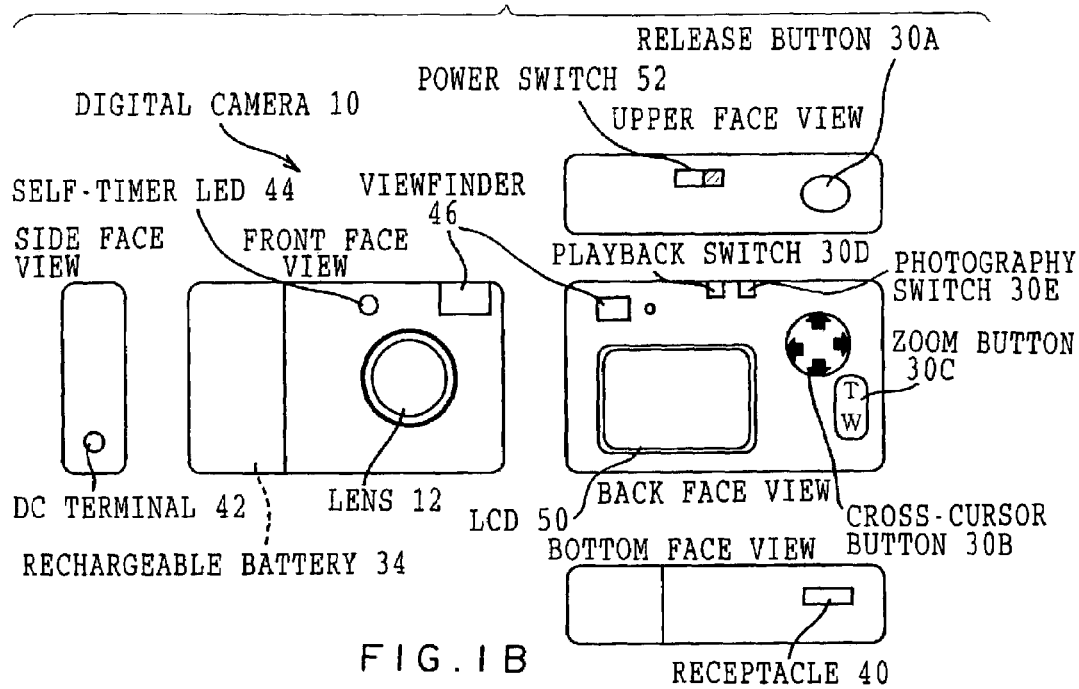
FIG. 1A is a view showing external appearance of a digital camera 10 relating to an embodiment of the present invention.

As shown in FIG. 1A, a lens 12, a self-timer LED 44 and a viewfinder 46 are provided at a front side of the digital camera 10. The lens 12 is for focusing a subject image. When a photograph is to be taken using a self-timing function, the self-timer LED 44 gives notice of the imminence of a shooting time by a flashing interval thereof. The viewfinder 46 is used for determining composition of a subject to be photographed.

A DC terminal 42 is provided at a side face of the digital camera 10. The DC terminal 42 is for connecting an unillustrated AC adapter which can be used with the digital camera 10. A release button (so-called a "shutter") 30A and a power switch 52 are provided at an upper face of the digital camera 10. The release button 30A is operated by pushing by a user when photography is to be executed.

The release button 30A relating to the present embodiment is structured to enable pushing operation in two stages, a state in which the release button 30A is pressed down to an intermediate position (below referred to as a "half-pressed state"), and a state in which the release button 30A is pressed down to a final pushed position beyond the intermediate position (below referred to as a "fully pressed state").

The digital camera 10 relating to the present embodiment is structured so as to be able to photograph moving images as well as photographing still images. When still image photography is to be carried out, an AE (automatic exposure) function operates when the release button 30A is pushed to the half-pressed state, and exposure conditions (shutter speed and aperture) are specified. Then, an AF (auto focus) function operates and controls focusing. Thereafter, exposure (photography) is carried out when the release button 30A is further pushed to the fully pressed state.

On the other hand, when moving image photography is to be carried out, the moving image photography is commenced by the release button 30A being pushed to the fully pressed state. The digital camera 10 is structured such that the moving image photography can be stopped by temporarily returning the release button 30A from the pressed state to an unpressed state and then pushing the release button 30A back to the fully pressed state again. Thus, with the digital camera 10 relating to the present embodiment, the release button 30A is put into the fully pressed state when moving image photography is to be commenced, and is returned to the fully pressed state when this photography is to be terminated. However, the digital camera 10 is not necessarily limited thus, and may be set up such that moving image photography is carried out only as long as the release button 30A is fully pressed.

At a back face of the digital camera 10, an eyepiece of the aforementioned viewfinder 46, a liquid crystal display (hereafter referred to as an "LCD") 50, a playback switch 30D, a photography switch 30E, a cross-cursor button 30B and a zoom button 30C are provided. The LCD 50 is for displaying a subject image, which is represented by digital image data obtained by photography, various menu screens, messages and the like. The playback switch 30D is operated when a playback mode is to be specified. The playback mode is a mode which displays (replays) the subject image represented by the digital image data obtained by photography. The photography switch 30E is operated when a photography mode, which carries out photography, is to be specified. The cross-cursor button 30B is provided with four arrow keys representing directions of movement in the four directions, up, down, left and right, of a display region of the LCD 50. The zoom button 30C is operated when zooming of the subject image (magnification or diminution) is to be carried out during photography. The zoom button 30C is structured with a telephoto button, which corresponds to the position of the "T" in FIG. 1, and a wide angle button, which corresponds to the position of the "W" in FIG. 1. The telephoto button is operated when the subject image is to be magnified (enlarged), and the wide angle button is operated when the subject image is to be diminished (shrunk). Furthermore, in addition to the function of specifying the photography mode, the photography switch 30E fulfils a function of specifying which of still image photography and moving image photography is to be carried out.

A receptacle 40 is provided at a bottom face of the digital camera 10. The receptacle 40 is used for connection with external apparatus using a predetermined interface standard (in the present embodiment, USB). A rechargeable battery 34 is accommodated at a grip portion of the digital camera 10. The rechargeable battery 34 supplies electrical power to each part of the digital camera 10 in a state in which the digital camera 10 is not connected to the AC adapter.

Next, a state in which the digital camera 10 is connected to external apparatus using a cradle 60 will be described with reference to FIG. 1B. The cradle 60 is used for simple connection of the digital camera 10 with external apparatuses such as a personal computer (below referred to as a "PC"), a PDA (personal digital assistant) and the like. (Herein, the external apparatus is a PC 80.)

Figure 1B:
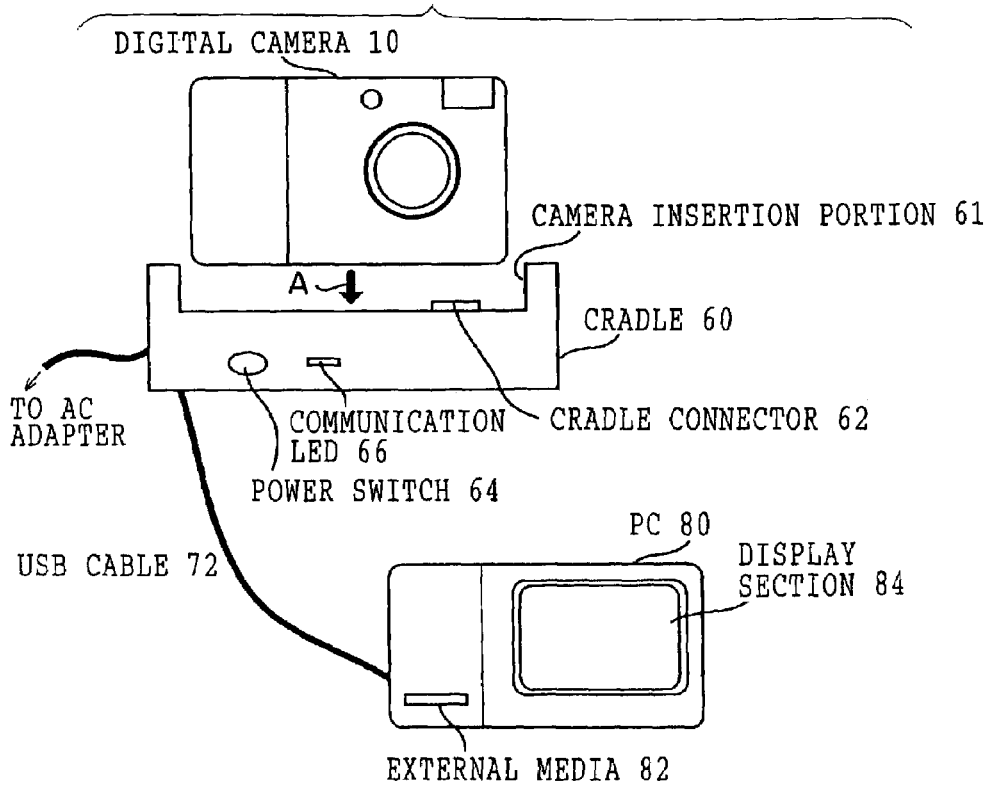
FIG. 1B is a view showing a state when the digital camera 10 of the present invention is connected with an external apparatus using a cradle 60.

As shown in FIG. 1B, the cradle 60 is provided with a camera insertion portion 61. The digital camera 10 is inserted at the camera insertion portion 61 when the digital camera 10 is to be connected to the external apparatus via the cradle 60. A cradle connector 62 is disposed at an inside bottom face of the camera insertion portion 61. The cradle connector 62 which corresponds with a connection terminal of the receptacle 40 is provided at the digital camera 10.

When the digital camera 10 is loaded at the cradle 60, the digital camera 10 is inserted in the direction of an arrow A in FIG. 1B, with the bottom face of the digital camera 10 facing downward. Consequently, the connection terminal of the receptacle 40 of the digital camera 10 is connected with the cradle connector 62. A USB cable 72 corresponding to the predetermined interface standard (USB in the present embodiment) is connected between the cradle 60 and the external apparatus. Thus, the digital camera 10 loaded at the cradle 60 can intercommunicate with the external apparatus in accordance with the predetermined interface standard.

The cradle 60 is provided with a power switch 64 and a communication LED 66. When the power switch 64 is operated by pushing in a state in which an unillustrated AC adapter for the cradle 60 is connected, the power switch 64 switches electronic power supply on or off. The communication LED 66 lights up when communication is being performed between the digital camera 10 loaded at the cradle 60 and the external apparatus connected to the cradle 60.

Below, a case in which the PC 80 is employed as the external apparatus connected to the digital camera 10 via the cradle 60 will be described. An external media 82 (in the present embodiment, a SMART MEDIA), at which various kinds of information can be recorded, is loaded at the PC 80, and the PC 80 is provided with a display section 84 (in the present embodiment, a liquid crystal display) which displays various kinds of information.

For the present embodiment, a case of dubbing will be described in which an image file, which has been recorded by photography to a later-described recording media 26 (not shown in FIG. 1, see FIG. 2) loaded at the digital camera 10, is dubbed to the external media 82 of the PC 80 via the cradle 60.

Now, electrical structure of the digital camera 10 relating to the present embodiment will be described with reference to FIG. 2.

Figure 2:
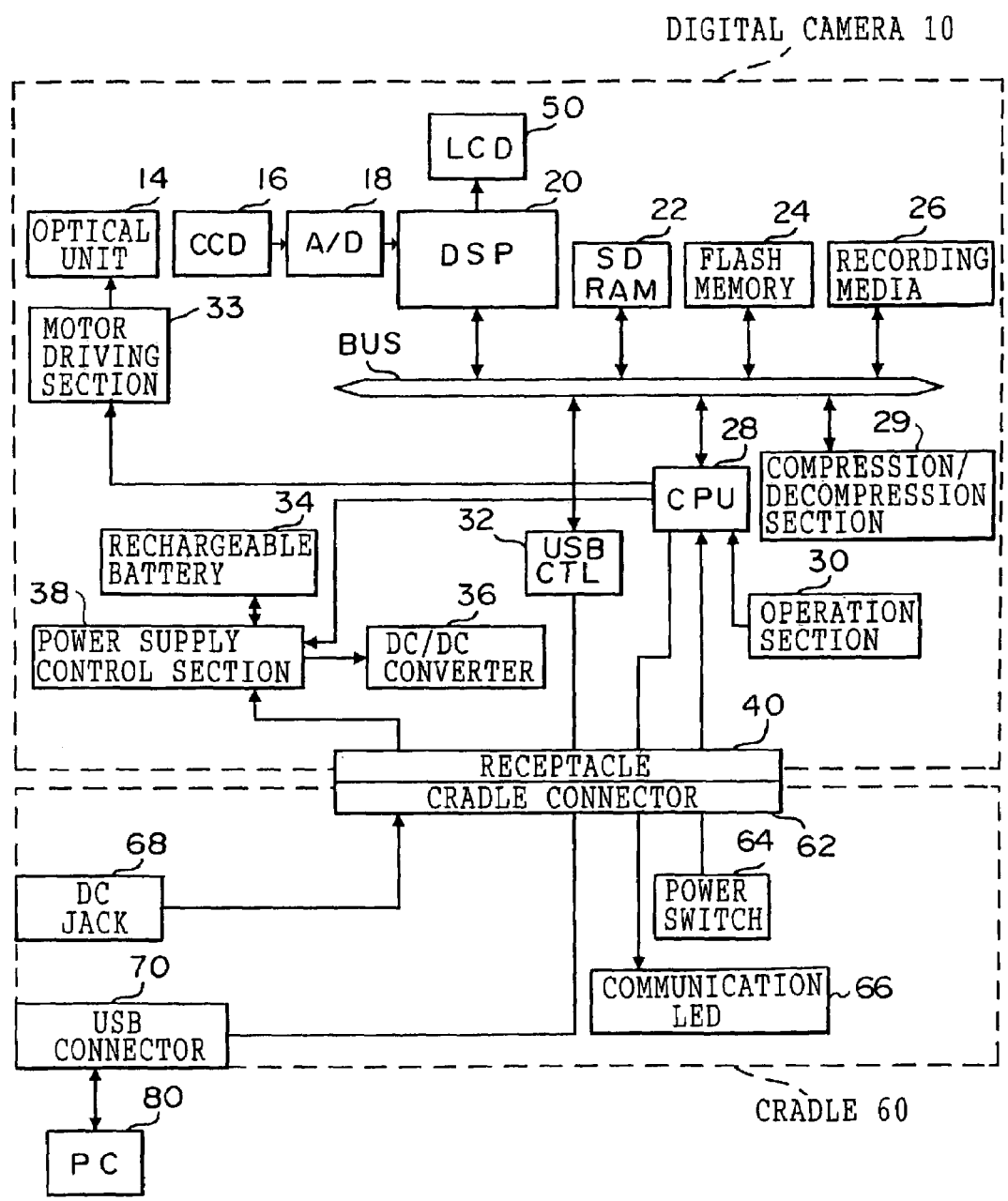
FIG. 2 is a block diagram showing electrical structures of the digital camera 10 relating to the embodiment of the present invention and the cradle 60, and showing electrical connection states when the digital camera 10 is loaded at the cradle 60.

As shown in FIG. 2, the digital camera 10 has structure which includes an optical unit 14, a CCD (charge coupled device) 16, an analog-to-digital converter (below referred to as an "A/D converter") 18, a DSP (digital signal processor) 20, an SDRAM (synchronous dynamic random access memory) 22, a flash memory 24, a CPU (central processing unit) 28, and a compression/decompression section 29. The optical unit 14 has a structure including the aforementioned lens 12. The CCD 16 is disposed rearward on an optical axis of the lens 12. The A/D converter 18 converts analog image signals that are inputted thereto into digital image data. The DSP 20 includes a line buffer having a predetermined capacity, implements predetermined digital signal processing on digital image data inputted thereto, and handles display operations for the LCD 50. The SDRAM 22 principally stores digital image data obtained by photography. Various programs, parameters and the like are stored in advance at the flash memory 24. The CPU 28 handles overall operations of the digital camera 10. The compression/decompression section 29 performs compression processing on the digital image data to predetermined compression formats, and performs decompression processing on digital image data that has been compressed.

As the predetermined compression formats in the digital camera 10 relating to the present embodiment, the JPEG (Joint Photographic Experts Group) format is employed for compression of digital image data of still images, and the Motion JPEG format is employed for compression of digital image data of moving images.

An output terminal of the CCD 16 is connected to an input terminal of the A/D converter 18, an output terminal of the A/D converter 18 is connected to an input terminal of the DSP 20, and an output terminal of the DSP 20 is connected to an input terminal of the LCD 50. The DSP 20, the SDRAM 22, the flash memory 24, the CPU 28 and the compression/decompression section 29 are mutually connected by a bus. Accordingly, the CPU 28 can freely access the SDRAM 22 and the flash memory 24, and can control operations of the DSP 20 and the compression/decompression section 29.

The digital camera 10 relating to the present embodiment is structured to enable loading of the portable recording media 26, such as a SMART MEDIA, an IC card, a CD-R, a CD-RW or the like. In a state in which the recording media 26 is loaded at the digital camera 10, the recording media 26 is electronically connected with the bus. Accordingly, the CPU 28 can freely access the recording media 26.

For the CCD 16 relating to the present embodiment, an area CCD whose pixel counts in both the horizontal direction and the vertical direction are greater than pixel counts of the LCD 50 and the display section 84 of the PC 80 is employed. Specifically, the pixel numbers of the CCD 16 are 1280 pixels in the horizontal direction and 960 pixels in the vertical direction, and the pixel numbers of the LCD 50 and the display section 84 are 640 pixels in the horizontal direction and 480 pixels in the vertical direction (VGA size). That is, the CCD 16 is a CCD that has twice as many pixels in both the horizontal direction and the vertical direction as the LCD 50 and the display section 84.

Signals representing a subject image, which are outputted from the CCD 16, are sequentially inputted to the A/D converter 18. The A/D converter 18 converts R (red), G (green) and B (blue) signals to 12-bit R, G and B signals (below referred to as digital image data), respectively, and outputs this digital image data to the DSP 20.

The DSP 20 accumulates the digital image data sequentially outputted from the A/D converter 18 at the line buffer included in the DSP 20, and temporarily stores the digital image data at the SDRAM 22.

The CPU 28 reads out the digital image data stored at the SDRAM 22, carries out white balance adjustment on the digital image data by applying digital gain in accordance with a light source type, carries out gamma processing and sharpness processing, and generates 8-bit digital image data. Further, the CPU 28 performs YC signal processing to generate luminance signals Y and chroma signals Cr and Cb (below referred to as "YC signals"), and stores the YC signals back at the SDRAM 22.

The LCD 50 is structured to be capable of displaying moving images obtained by continuous photography by the CCD 16 (a through-image), and thus can be used as a viewfinder. When the LCD 50 is used as a viewfinder in this manner, the generated YC signals are sequentially outputted to the LCD 50 via the DSP 20. Accordingly, the through-image is displayed at the LCD 50. As mentioned above, the CCD 16 relating to the present embodiment has twice as many pixels in the horizontal direction and in the vertical direction as the LCD 50. Therefore, when the through-image is to be displayed at the LCD 50, the YC signals are sequentially outputted to the LCD 50 with one of every two adjacent pixels in both the horizontal direction and the vertical direction being thinned out.

When the photography mode and still image photography have been specified by the photography switch 30E, and the release button 30A is put into the fully pressed state by a camera operator, YC signals that are stored at the SDRAM 22 at this point in time are compressed into the predetermined compression format (JPEG format in the present embodiment) by the compression/decompression section 29, and then recorded at the recording media 26 as an image file.

When the photography mode and moving image photography have been specified by the photography switch 30E, during a period from a point in time when the release button 30A is put into the fully pressed state to a point in time when the release button 30A is put into the fully pressed state subsequently, that is, a period in which moving image photography is to be carried out, YC signals stored at the SDRAM 22 are compressed into the predetermined compression format (Motion JPEG in the present embodiment) at predetermined intervals (in the present invention, $\frac{1}{30}$ second (0.033 . . . seconds)) by the compression/decompression section 29, and then recorded at the recording media 26 as an image file. Accordingly, when moving image photography is carried out by the digital camera 10 relating to the present invention, moving images can be recorded to the recording media 26 at 30 frames/second.

Here, whether the image files recorded at the recording media 26 are still images or moving images, all pixels acquired by the CCD 16 (in the present embodiment, 1280 pixels in the horizontal direction by 960 pixels in the vertical direction) are recorded. Therefore, when the pixel numbers in both the horizontal direction and the vertical direction of an image that has been recorded as an image file are to be reduced for carrying out magnification or diminution, a below-described magnification ratio upper limit value C, which is an upper limit value at a time of magnification and is determined on the basis of the pixel numbers in each of the horizontal and vertical directions of the image recorded as the image file and the pixel numbers in each of the horizontal and vertical directions of the magnified or diminished image, is restricted. Consequently, the magnification or diminution can be carried out simply by thinning out pixel units from the digital image data of the image file without generating new image data (pixel unit data) that was not obtained at the time of photography, by interpolation processing or the like. Therefore, magnification or diminution of the image can be carried out in a state such that image quality does not deteriorate.

Various switches and buttons (labeled in common as an "operation section 30" in FIG. 2), including the above-described release button 30A, cross-cursor button 30B, zoom button 30C, playback switch 30D, photography switch 30E and power switch 52, are connected to the CPU 28. Accordingly, the CPU 28 can acquire operation states of these buttons and switches at all times.

The CPU 28 is also connected to an input terminal of a motor driving section 33. An output terminal of the motor driving section 33 is connected to a focus adjustment motor and zoom motor which are provided at the optical unit 14.

The lens 12 included at the optical unit 14 relating to the present invention is structured with a plurality of lenses, serves as a zoom lens capable of altering focusing distance (varying magnification), and is provided with an unillustrated lens driving mechanism. This lens driving mechanism includes the zoom motor and the focus adjustment motor. The zoom motor and the focus adjustment motor are each driven by driving signals supplied from the motor driving section 33 under the control of the CPU 28.

When an optical zoom ratio is to be altered, the CPU 28 controls to drive the zoom motor, and changes the focusing distance of the lenses included at the optical unit 14.

The CPU 28 carries out focus control by controlling to drive the focus adjustment motor such that contrast of an image obtained by photography by the CCD 16 is maximized. That is, in the digital camera 10 relating to the present embodiment, a so-called TTL (through the lens) system, of specifying lens positions so as to maximize contrast of the image that is captured, is employed for focusing control.

A USB controller 32, which is connected to the bus, is built in at the digital camera 10. In the state in which the digital camera 10 is loaded at the cradle 60 and the receptacle 40 is connected with the cradle connector 62, the USB Controller 32 handles USB communications with the external apparatus (the PC 80 in the present embodiment) via a USB connector 70 provided at the cradle 60.

Furthermore, a DC/DC converter 36 and a power supply control section 38 are built in at the digital camera 10. The DC/DC converter 36 supplies direct current electrical power at predetermined levels to each section, and the power supply control section 38 carries out control relating to the supply of electric power. The power supply control section 38 is connected to the DC/DC converter 36 and the aforementioned rechargeable battery 34. In the state in which the digital camera 10 is loaded at the cradle 60 and the receptacle 40 is connected with the cradle connector 62, the power supply control section 38 is connected with a DC jack 68 which is provided at the cradle 60. In a case in which an unillustrated AC adapter is connected to the DC jack 68, direct current power at a predetermined level is supplied from the AC adapter to the power supply control section 38.

At times when the digital camera 10 is loaded at the cradle 60 and DC power at the predetermined level is supplied to the power supply control section 38 from the cradle 60, the power supply control section 38 charges up the rechargeable battery 34 by supplying DC power from the cradle 60 if the power switch 52 is in an "off" state, and if the power switch 52 is in an "on" state, the power supply control section 38 charges up the rechargeable battery 34 by supplying DC power from the cradle 60 and at the same time supplies DC power to the DC/DC converter 36. Thus, the power supply control section 38 implements the supply of electrical power to each part of the digital camera 10.

At times when the digital camera 10 is not loaded at the cradle 60 but an AC adapter is connected to the DC terminal 42, the power supply control section 38 charges up the rechargeable battery 34 by supplying DC power thereto from the AC adapter if the power switch 52 is in the off state, and if the power switch 52 is in the on state, the power supply control section 38 charges up the rechargeable battery 34 by supplying DC power from the cradle 60 and at the same time supplies DC power to the DC/DC converter 36. Thus, the power supply control section 38 implements the supply of electrical power to each part of the digital camera 10.

At times when the digital camera 10 is not loaded at the cradle 60 and the AC adapter is not connected to the DC terminal 42, and the power switch 52 is in the on state, the power supply control section 38 controls the relevant sections such that DC power is supplied from the rechargeable battery 34 to each part of the digital camera 10.

Now, in the state in which the digital camera 10 is loaded at the cradle 60 and the receptacle 40 is connected with the cradle connector 62, the CPU 28 is connected with the aforementioned power switch 64 and communication LED 66 provided at the cradle 60. Accordingly, the CPU 28 can ascertain on/off states of the power switch 64 of the cradle 60. Moreover, by controlling such that the communication LED 66 lights up when the CPU 28 performs communication with the external apparatus connected via the cradle 60, the CPU 28 can indicate clearly that communication is being carried out via the cradle 60.

The digital camera 10 relating to the present embodiment is provided with the following three functions, which are functions for times of dubbing and times of replaying image files that have been recorded at the recording media 26 by moving image photography.

(1) A range designation function for designating an image range, of images included in an image file, for which dubbing and/or playback is to be executed.

(2) A zooming function for carrying out zooming (magnification/diminution), using electronic zoom, of the images to be dubbed and/or replayed.

(3) A trimming function for magnifying, by electronic zoom, and trimming a partial region of the images to be dubbed and/or replayed.

Figure 3:
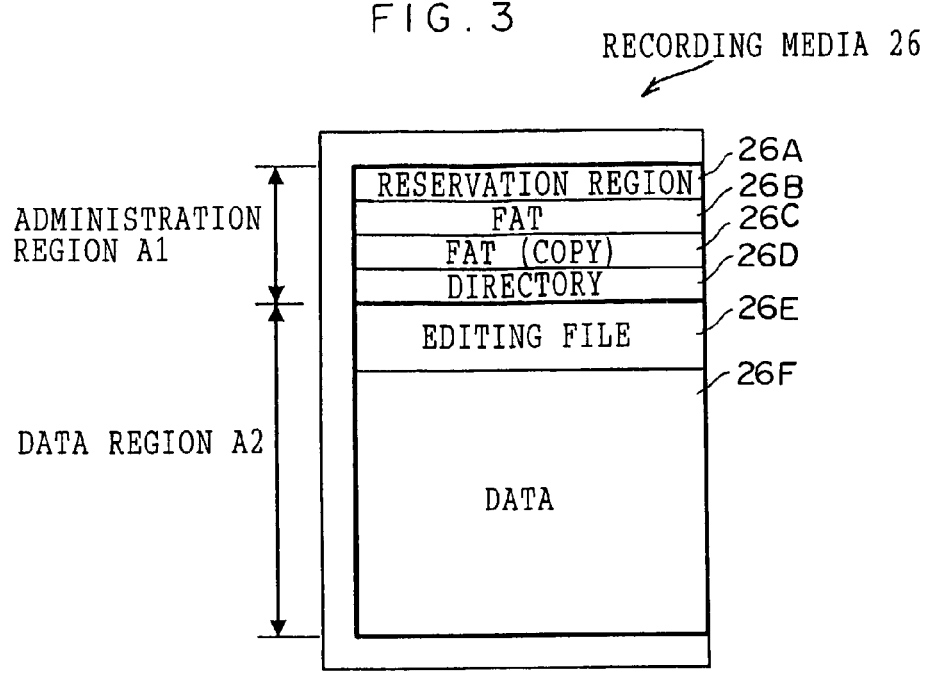
FIG. 3 is a diagram showing structure of a recording region of a recording media 26 relating to the embodiment of the present invention.

Next, structure of a recording region of the recording media 26 relating to the present embodiment will be described with reference to FIG. 3. As shown in FIG. 3, the recording region of the recording media 26 is principally divided into an administration region A1 and a data region A2.

The A1 includes regions such as a reservation region 26A, an FAT (file allocation table) 26B, an FAT 26C, and a directory 26D. The reservation region 26A is a region for administration of the file. The FAT 26B is a table showing states of usage of each of subdivisions that each have a predetermined data size, into which subdivisions a region for recording data is divided. The FAT 26C has the same contents as the FAT 26B. Two FATs are provided for reasons of safety. Techniques of administering recording media using directories and FATs are well known. Therefore, detailed descriptions thereof are not provided here.

On the other hand, the data region A2 includes regions such as an editing file recording region 26E and a data recording region 26F. The editing file recording region 26E is a region for recording an editing file, which includes information relating to the three functions mentioned above, that is, the range designation function, the zooming function and the trimming function. The data recording region 26F is a region at which digital image data obtained by photography is recorded in file units as image files. The editing file is a file which records various kinds of information representing processing results of various image editing processes, described later, which are applied to the image files which are recorded at the recording media 26 by moving image photography. The editing files are created and recorded one for each moving image image file that has been subjected to the image editing processes.

Figure 4:
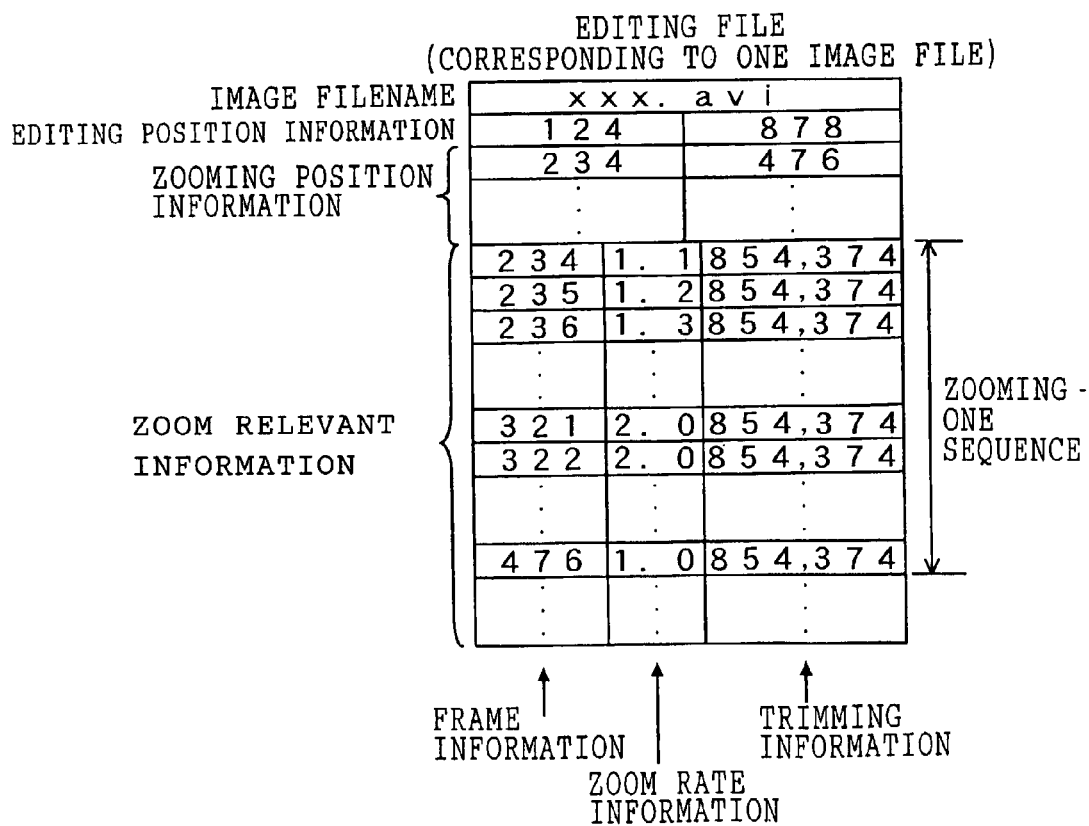
FIG. 4 is a diagram showing structure of an editing file relating to the embodiment of the present invention.

Below, structure of the editing file relating to the present embodiment will be described with reference to FIG. 4. FIG. 4 illustrates a structure corresponding to a single image file.

As shown in FIG. 4, information representing the filename of an image file which has been a subject of processing with the image editing processes (below referred to as an "editing object file") and editing position information are recorded in the editing file relating to the present embodiment. The editing position information is structured by information of two positions, that is, editing commencement position information and editing termination position information. When dubbing or playback of the editing object file is to be executed, the editing commencement position information represents a position in the editing object file of a scene at which commencement of such execution is desired, and the editing termination position information represents a position in the editing object file of a scene at which termination of this execution is desired. Here, the editing position information is information relating to the aforementioned range designation function.

Furthermore, zooming position information and zoom relevant information are recorded at the editing file. The zooming position information is structured by zoom commencement position information and zoom termination position information. The zoom commencement position information represents a position in the editing object file of a scene at which commencement of zooming, when dubbing or playback of the editing object file is being executed, is desired. The zoom termination position information represents a position in the editing object file of a scene at which termination of execution of the zooming is desired. The zoom relevant information is structured by frame information, zoom rate information and trimming information. The frame information represents each of images (frames) during a zooming period represented by the zooming position information. The zoom rate information represents zooming rates for the frames represented by the frame information. The trimming information represents positional coordinates in the frames for trimming, when trimming is to be carried out. Here, the frame information and the zoom rate information are information relating to the aforementioned zooming function, and the trimming information is information relating to the aforementioned trinmning function.

Information for each of the editing position information and the zooming position information is recorded as frame information indicating the corresponding images. In the present embodiment, frame information in the editing position information, the zooming position information and the zoom relevant information is represented by image numbers (below referred to as "frame numbers"), which are assigned in ascending order from a first image of the images that structure the moving image image file.

Thus, in the editing file shown in FIG. 4, "124" is recorded as the editing commencement position information and "878" is recorded as the editing termination position information. This case represents digital image data from the image (scene) with frame number 124 to the image with frame number 878 being dubbed and/or replayed on subsequent occasions.

Further, in the editing file shown in FIG. 4, "234" is recorded as the zoom commencement position information and "476" is recorded as the zoom termination position information. This case represents zooming, based on the zoom rate information and trimming information recorded as the zoom relevant information of the editing file, for each image from the image with frame number 234 to the image with frame number 476.

In the present embodiment, the trimming information is represented by a horizontal direction coordinate and a vertical direction coordinate, which indicate a central position of a trimmed image region. In the present embodiment, the horizontal direction coordinate and the vertical direction coordinate are represented by a pixel number in the horizontal direction and a pixel number in the vertical direction, with a pixel located at a top-left corner portion of the image being taken as an origin (0, 0) of the coordinates.

Accordingly, the editing file shown in FIG. 4 represents, for example, for the image with frame number 234, that dubbing and/or playback on a subsequent occasion is carried out at a magnification of 1.1 and centered on a position with the horizontal direction coordinate 854 and the vertical direction coordinate 374 (the position of a point of intersection of a straight line extending in the vertical direction from an 854th pixel in the horizontal direction from the top-left corner portion of the image and a straight line extending in the horizontal direction from a 374th pixel in the vertical direction from the top-left corner portion).

Where the present specification refers to "dubbing a magnified image" or "dubbing a diminished image", this means processing (resizing) and dubbing the image data such that images represented by the digital image data appear magnified or diminished when replayed by a similar playback device such as the liquid crystal display or the like.

The CCD 16 corresponds to an imaging section of the present invention. The recording media 26 corresponds to a recording section of the present invention. The LCD 50 corresponds to a display section of the present invention. The release button 30A corresponds to an editing operation section of the present invention. The zoom button 30C corresponds to a zoom information input section of the present invention. The CPU 28 corresponds to a limiting section and an information recording section of the present invention. The USB Controller 32 corresponds to a transmission section of the present invention.

The zoom button 30C also corresponds to a photographic zoom operation portion of a first aspect, which is mentioned above, the release button 30A corresponds to a photography operation portion of an above-mentioned second aspect, and the CPU 28 corresponds to a cutting out section and a zoom execution section of an above-mentioned third aspect.

Figure 5A:
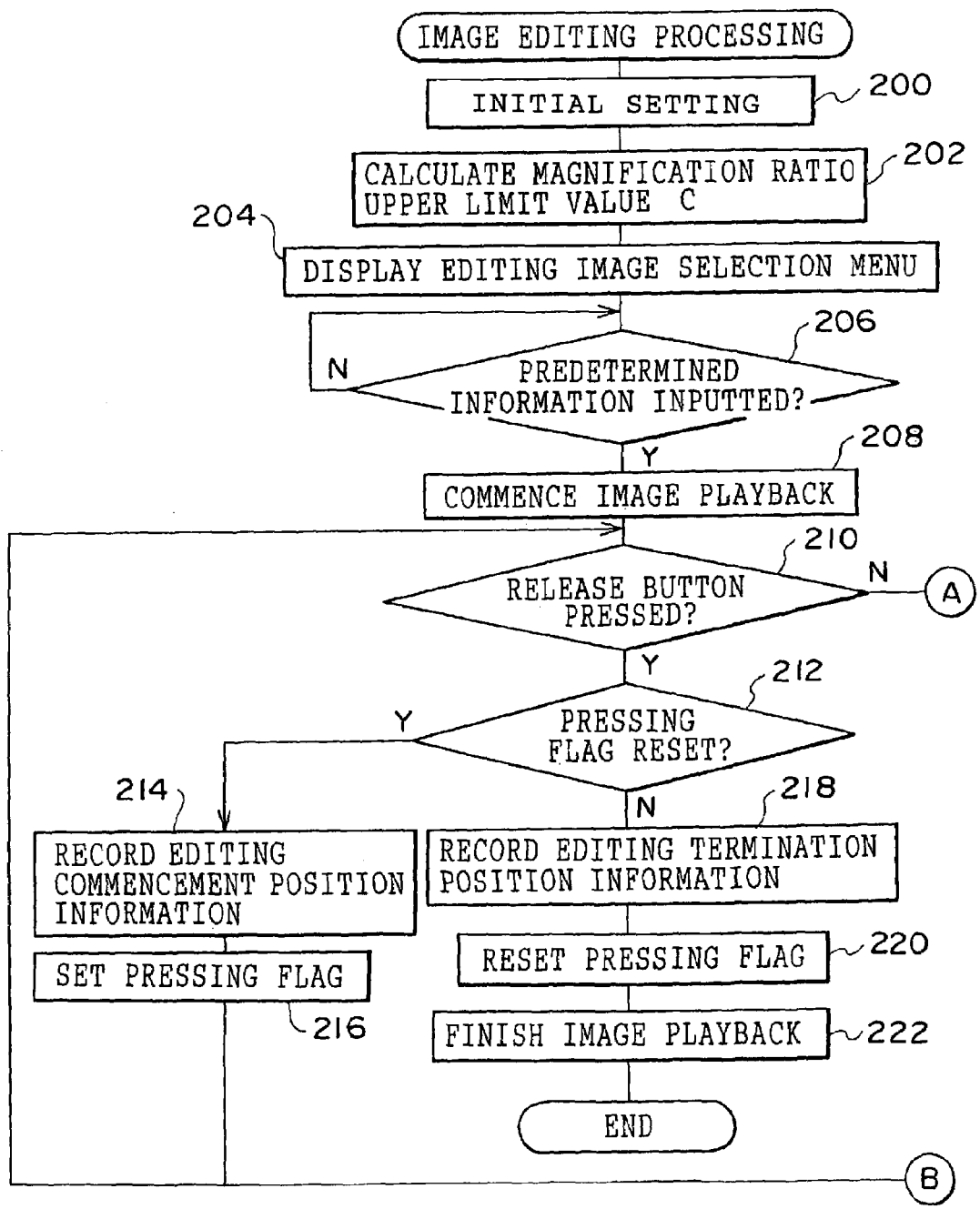
FIGS. 5A and 5B are a flowchart showing process flow of an image editing processing program relating to the embodiment of the present invention.
Figure 5B:
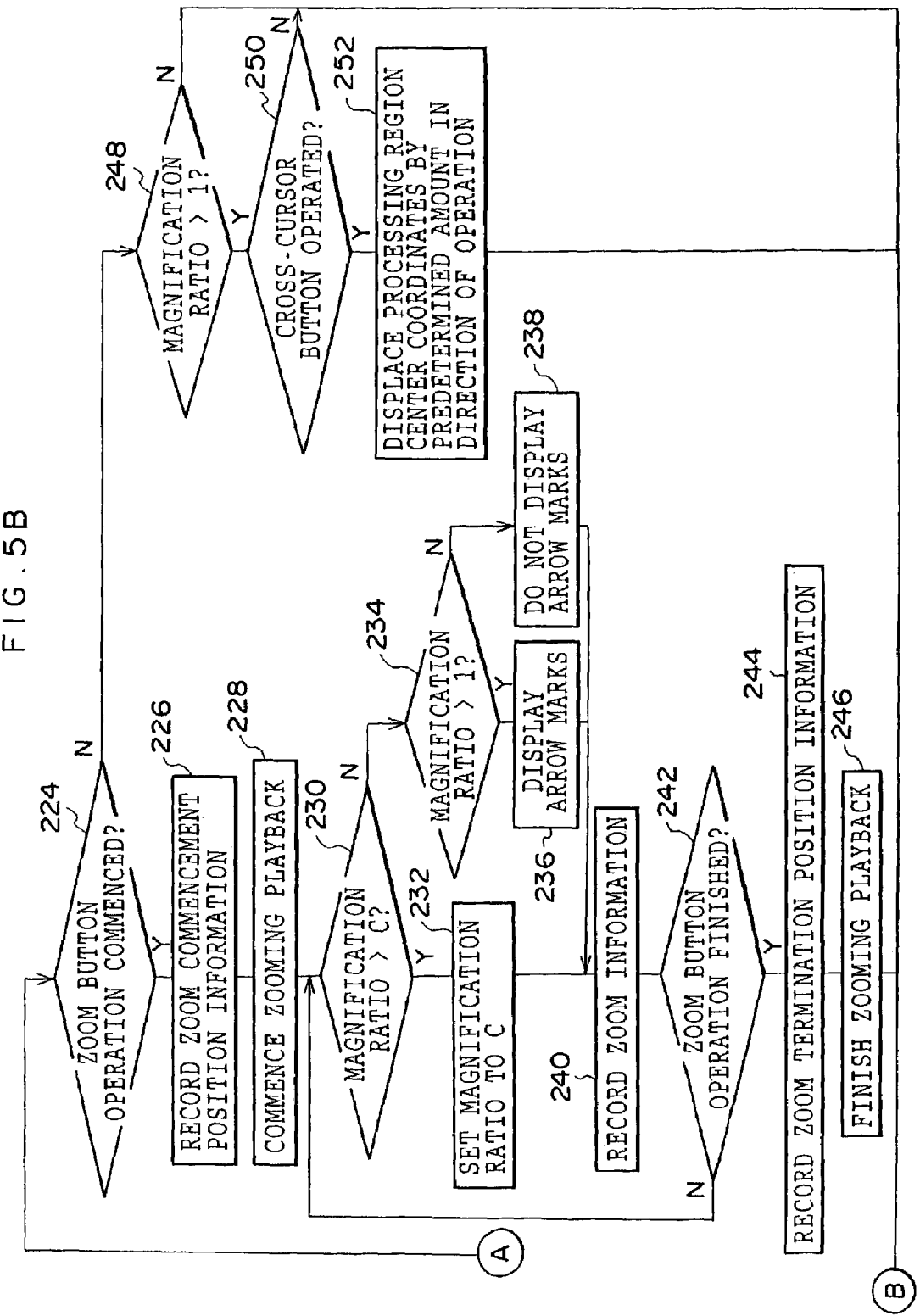

Next, operation of the digital camera 10 relating to the present embodiment will be described. First, an image editing process executed by the digital camera 10 will be described with reference to FIGS. 5A and 5B. FIGS. 5A and 5B are a flowchart showing process flow of an image editing processing program which is executed by the CPU 28 of the digital camera 10 when a user specifies a playback mode by operation of the playback switch 30D and instructs execution of image editing processing from an unillustrated menu screen of the digital camera 10. The program is stored in advance at a predetermined region of the flash memory 24. Herein, a case in which a plurality of moving image image files have been recorded at the data recording region 26F of the recording media 26 will be described.

In step 200 of FIGS. 5A and 5B, for initial setting, a pressing flag is reset (herein, the pressing flag is assigned the value '0') and processing region central coordinate variables are set to central coordinates in the horizontal direction and the vertical direction of the image represented by the image file (in the present embodiment, the horizontal direction coordinate is 640 and the vertical direction coordinate is 480). At a time when the release button 30A is put into the fully pressed state for the first time during execution of this image editing processing, the pressing flag is set (herein, assigned the value '1'). The processing region center coordinate variables represent central coordinates of an image region that will be trimmed when the trimming function is operated. Thus, in step 200, for initial setting of the central coordinates of a trimmed image region, a center position of the image represented by the image file is specified.

In a next step 202, the magnification ratio upper limit value C is calculated using the following equation (1).

$$C = \min(HD/HZ, VD/VZ) \quad \text{Equation (1)}$$

Here, HD and VD represent the horizontal direction pixel count and vertical direction pixel count, respectively, of the digital image data that is recorded as the image file, and HZ and VZ represent the horizontal direction pixel count and vertical direction pixel count of the digital image data after magnification. The operation min(X, Y) represents utilization of whichever of X and Y has a smaller value (if X and Y are equal, the common value thereof). In the present embodiment, the horizontal direction pixel count HZ and the vertical direction pixel count VZ are 640 pixels and 480 pixels, respectively, which is the VGA size of both the LCD 50 and the display section 84.

The horizontal direction pixel count HD and vertical direction pixel count VD of the digital image data in the image file relating to the present embodiment are 1280 pixels and 960 pixels, respectively, and the horizontal direction pixel count HZ and vertical direction pixel count VZ after magnification are 640 pixels and 480 pixels, respectively. Therefore, HD/HZ and VD/VZ are both 2 (=1280/640=960/480). Accordingly, the magnification rate upper limit value C is 2. In a case in which, for example, the horizontal direction pixel count HZ and vertical direction pixel count VZ of the digital image data after magnification are 320 pixels and 240 pixels, respectively, because the LCD 50 has QVGA (quarter VGA) size pixel counts or the like, then the magnification ratio upper limit value C will be 4 (=1280/320=960/240).

Herein, the horizontal direction pixel count HD and vertical direction pixel count VD of the digital image data recorded as the image file are not limited to integer multiples of the horizontal direction pixel count HZ and vertical direction pixel count VZ of the magnified digital image data. Cases in which one or both of HD/HZ and VD/VZ includes numbers to the right of the decimal point are also applicable. Herein, a case in which aspect ratios of the image represented by the digital image data recorded as the image file and the image represented by the magnified digital image data are respectively equal is described. However, cases in which the aspect ratios differ from one another are also applicable.

Figure 6A:
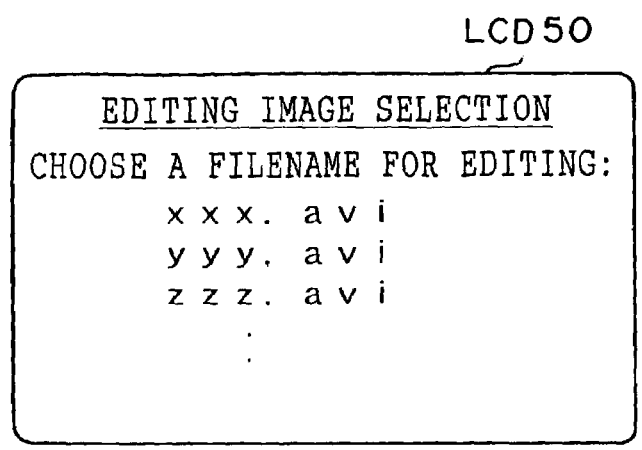
FIG. 6A is a view showing a display state of an editing image selection menu relating to the embodiment of the present invention.

In a next step 204, a pre-specified editing image selection menu is displayed at the LCD 50. At a next step 206, the CPU 28 waits for input of predetermined information by a user. FIG. 6A shows the editing image selection menu that is displayed at the LCD 50 by the processing of step 204. As is shown in FIG. 6A, the editing image selection menu displays a message prompting designation of a filename of an image file to be edited (the editing object file), and displays a list of filenames of the moving image image files that are recorded in the data recording region 26F of the recording media 26. Filenames of the moving image files only can be extracted from the image files that are recorded at the data recording region 26F by extracting files whose filenames, as recorded in the directory 26D of the recording media 26, have a filename extension appended thereto that indicates a moving image file (in the present embodiment, "avi", representing a motion JPEG file).

When this editing image selection menu is displayed at the LCD 50, the user chooses the filename of a desired image file by operation of the cross-cursor button 30B. Consequently, information representing the filename designated by the user is inputted to the CPU 28, the determination of step 206 becomes positive, and the process advances to step 208.

In step 208, the image file of the filename inputted in step 206 (the editing object file) is read out from the data recording region 26F of the recording media 26, and playback of the editing object file by the LCD 50 (display of the moving image) is commenced. Herein, playback is carried out with the position of a playback image, as indicated by the processing region center coordinate variables, set to match a center position of the display region of the LCD 50. Further, playback is carried out with a magnification rate of the image set to 1.

In a next step 210, it is determined whether or not the release button 30A has been put into the fully pressed state. If this determination is positive, then the process advances to step 212 and it is determined whether or not the pressing flag has been reset (i.e., in the present embodiment, whether or not the value of the pressing flag is '0'). If this determination is positive, then the process advances to step 214.

In step 214, the frame number of an image that is being displayed at the LCD 50 at this point in time is recorded to the editing file as the editing commencement position information. In a next step 216, the pressing flag is set, and then the process returns to step 210.

However, if the determination in step 212 is negative, then the process advances to step 218, and the frame number of an image that is being displayed at the LCD 50 at this point in time is recorded to the editing file as the editing termination position information. In a next step 220, the pressing flag is reset and then, in step 222, playback of the moving image finishes. Thereafter, this image editing processing program ends.

That is, if, at the point in time of execution of step 212, the pressing flag is in the reset state, then the operation of fully pressing the release button 30A that was detected by step 210 is the first such operation during execution of this image editing processing. Thus, the operation of fully pressing the release button 30A at this time can be regarded as being an operation for indicating a position of commencement of editing, and the position of the image being replayed at this point in time is recorded as the editing commencement position information. In contrast, if the pressing flag is in the reset state, at the point in time of operation of step 212, then the operation of fully pressing the release button 30A that was detected by step 210 is the second such operation during execution of this image editing process. Thus, the operation of pressing the release button 30A at this time can be regarded as being an operation for indicating a position of termination of editing, and the position of the image being replayed at this point in time is recorded as the editing termination position information. Thereafter, playback of the moving image finishes.

Thus, in the digital camera 10 relating to the present embodiment, because the release button 30A, which is operated at start times and finishing times of moving image photography, is also employed as an operation portion for designating an image range for executing dubbing and playback, designation of the image range can be carried out by operations that are the same as when moving image photography is performed. Thus, usability is extremely good.

Meanwhile, if the determination in step 210 is negative, then the process advances to step 224 and it is determined whether or not operation of the zoom button 30C has commenced. If this determination is positive, then the process advances to step 226 and the frame number of an image that is being displayed at the LCD 50 at this point in time is recorded at the editing file as zoom commencement position information. In a next step 228, zoomed playback using electronic zoom is commenced in accordance with operation of the zoom button 30C by the user. Specifically, in this step 228, when the telephoto button of the zoom button 30C is pressed for operation by the user, the image that is being replayed is magnified by a predetermined ratio (1.01 in the present embodiment) and displayed. When the wide angle button of the zoom button 30C is pressed for operation by the user, the image that is being replayed is diminished by a predetermined ratio (0.09 in the present embodiment) and displayed.

In a next step 230, it is determined whether or not the magnification rate of the playback image at the LCD 50 at this point in time exceeds the magnification rate upper limit value C. If this determination is positive, then the process advances to step 232, the magnification rate of the playback image is set to the magnification rate upper limit value C, and then the process advances to step 240.

On the other hand, if the determination in step 230 is negative, then the process advances to step 234, and it is determined whether or not the magnification rate of the playback image exceeds 1. If this determination is positive, then the process advances to step 236 and up, down, left and right arrow marks are displayed superimposed on the playback images of the LCD 50, and then the process advances to step 240. If this determination is negative, then the process advances to step 238 and the arrow marks that are displayed in step 236 are set to not display, and then the process advances to step 240.

Because of the processing of steps 230 and 232, magnification rates of the playback images can be restricted to values in a range of not more than the magnification rate upper limit value C. Therefore, digital image data for the playback images can be generated simply by thinning out pixel positions from the digital image data of the editing object file stored at the recording media 26, and a deterioration in quality of the playback images in accordance with the magnification and diminution does not occur. This will be described in detail with reference to FIGS. 7A to 7C. Note that FIGS. 7A to 7C show a case in which the processing region center coordinates are set to the center position of the playback images.

Figure 7A:
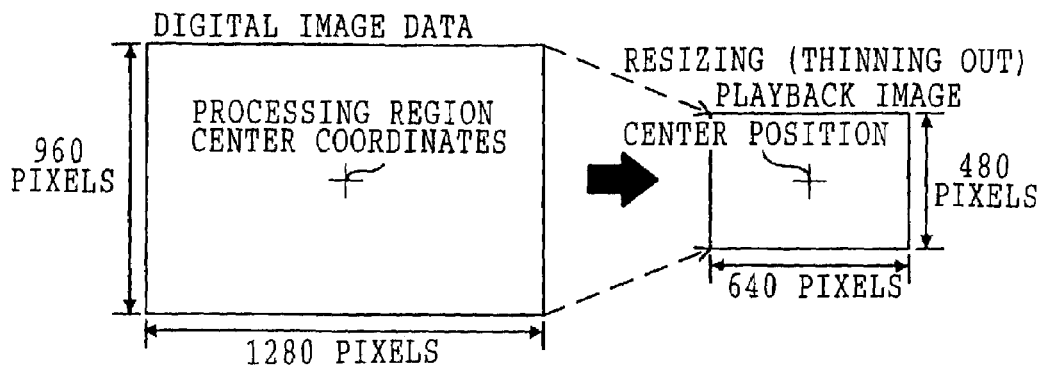
FIGS. 7A to 7C are diagrams for explaining why image deterioration does not occur in the digital camera 10 relating to the embodiment of the present invention.

When the magnification rate of a playback image is 1, then, with the position represented by the processing region center coordinate variables having been set to the center position, a data region of the digital image data is cut out in accordance with the size of the playback image, as shown in FIG. 7A. Resizing of the playback image can be carried out using the digital image data, by performing thinning out of one pixel from every two neighboring pixels in both the horizontal direction and the vertical direction of the data that has been cut out. That is, because pixel numbers of the digital image data relating to the present embodiment are twice the pixel numbers of the LCD 50 in both the horizontal direction and the vertical direction, when a case in which the whole of the image region represented by the digital image data is displayed at the whole of the display region of the LCD 50 is considered, then the pixel numbers of the digital image data can be made equal to the display pixel numbers of the LCD 50 by simply thinning out one pixel from every two pixels in both the horizontal direction and the vertical direction.

Figure 7B:
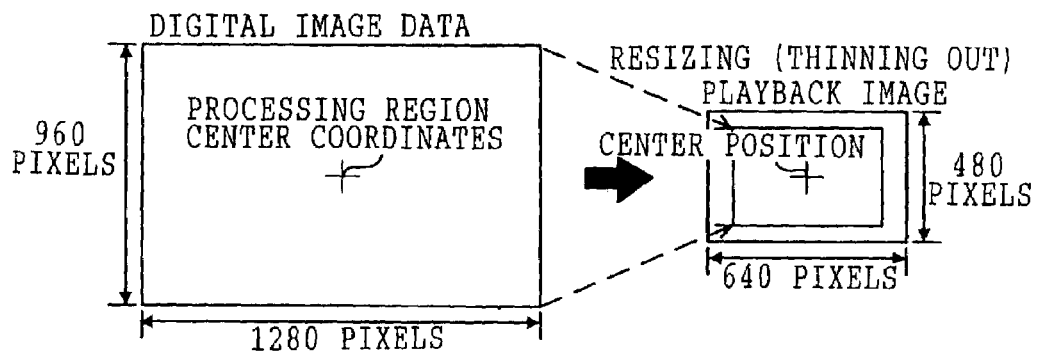

When the magnification rate of a playback image is less than 1, that is, when the playback image are diminished, with the position represented by the processing region center coordinate variables having been set to the center position, a data region of the digital image data corresponding to the size of the playback image is cut out, as shown in FIG. 7B. Resizing of the playback image may be carried out with the digital image data, by performing thinning out of pixels from the data that has been cut out in both the horizontal direction and the vertical direction, in a proportion corresponding to the magnification rate. The thinning out proportion at this time is a value greater (for example, thinning out 2 pixels from every 3 pixels, 3 pixels from every 4, or the like) than in the case in which the magnification rate of the playback images is 1 (1 pixel from every 2 pixels is thinned out).

Figure 7C:
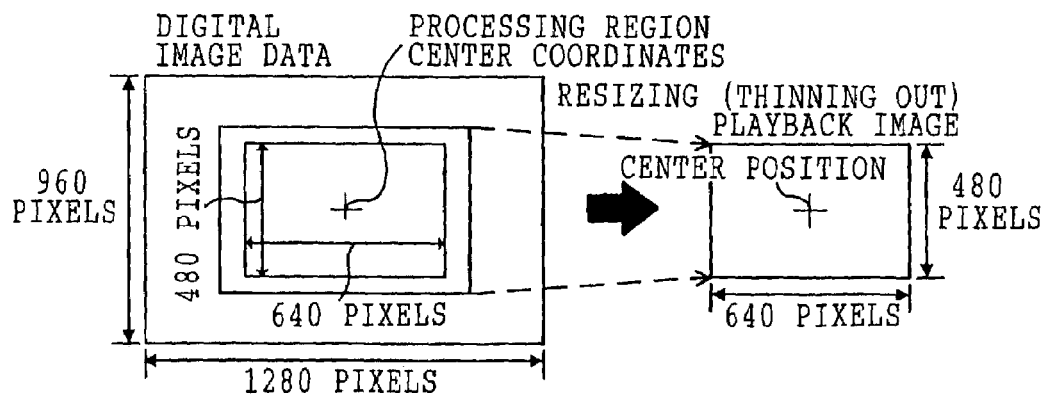

Further, when the magnification rate of a playback image is greater than 1 but not more than the magnification rate upper limit value C, with the position represented by the processing region center coordinate variables having been set to the center position, a data region of the digital image data corresponding to the size of the playback image is cut out, as shown in FIG. 7C. Resizing of the playback image can be carried out with the digital image data by performing thinning out of pixels, in both the horizontal direction and the vertical direction, from the data that has been cut out, in a proportion corresponding to the magnification rate. The thinning out proportion in this case is a value (for example, thinning out 1 pixel from every 3 pixels, 1 pixel from every 4, or the like) which is smaller than in the case in which the magnification rate of the playback images is 1.

Thus, in the digital camera 10 relating to the present embodiment, because pixel numbers of the CCD 16 in both the horizontal direction and the vertical direction are greater than pixel numbers of the magnified image, pixel numbers of the images recorded by photography are greater in both the horizontal direction and the vertical direction than pixel numbers of the magnified images. Also, because the magnification rate of the playback images is limited to not more than the magnification rate upper limit value C, the playback images can be generated simply by thinning out pixels of the damage digital image data. Thus, deterioration of image quality when data of pixels which were not obtained optically are generated by interpolation processing or the like is avoided.

Figure 6B:
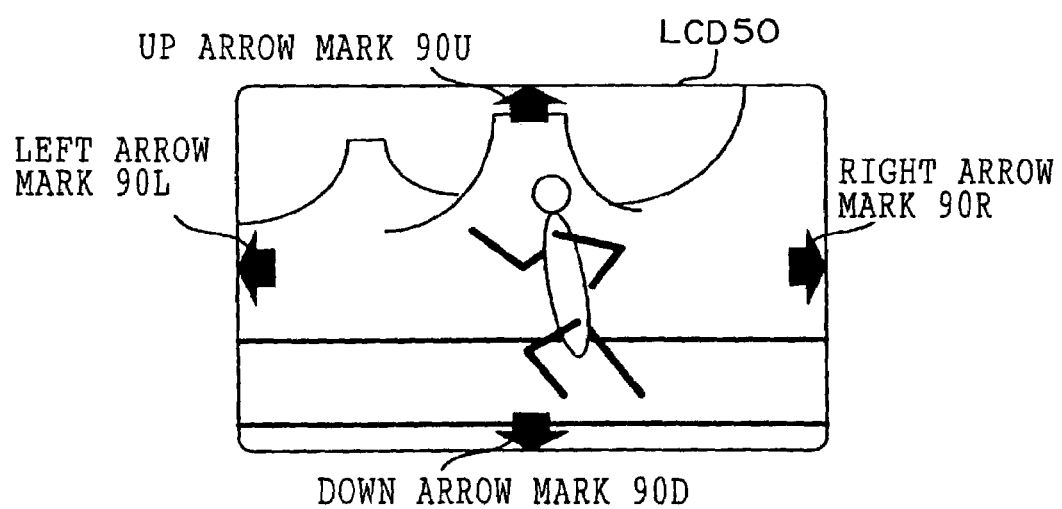
FIG. 6B is a view showing a display state of arrow marks relating to the embodiment of the present invention.

Furthermore, because of the processing of steps 234 to 238, in a case in which the magnification rate of the playback images is greater than 1 but not more than the magnification rate upper limit value C, at the same time as the moving image is displayed, an up arrow mark 90U is displayed at an upper end portion vicinity of the display region of the LCD 50, a down arrow mark 90D is displayed at a lower end portion vicinity thereof, a left arrow mark 90L is displayed at a left end portion vicinity thereof, and a right arrow mark 90R is displayed at a right end portion vicinity thereof, as shown in FIG. 6B. In cases in which the magnification rate of the playback images is less than or equal to 1, these arrow marks 90U, 90D, 90L and 90R are not displayed.

These arrow marks 90U, 90D, 90L and 90R indicate that the center position of the playback image displayed at the LCD 50 can be moved in the directions shown by the arrow marks by pushing to operate arrow keys of the cross-cursor button 30B, which correspond to the directions shown by the arrow marks. Thus, in the digital camera 10 relating to the present embodiment, in a state in which the playback image has been magnified by operation of the zoom button 30C, the playback image can be scrolled on the LCD 50 by operation of the cross-cursor button 30B. Thus, a range for trimming of the image that is being replayed at the LCD 50 at this time can be specified.

In step 240, together with the frame information for each frame, information representing the magnification rate of the playback image at that point in time is recorded to the editing file as zoom rate information and coordinate values for each of a horizontal direction coordinate and a vertical direction coordinate that are assigned to the processing region center coordinate variables are recorded to the editing file as trimming information. In a next step 242, it is determined whether or not the operation of the zoom button 30C that was detected in step 224 has finished. If this determination is negative, the process returns to step 230. When this determination has become positive, the process advances to step 244.

In step 244, the frame number of an image that is being replayed at the LCD 50 at this point in time is recorded to the editing file as zoom termination position information. In a next step 246, the zooming playback that was commenced in step 228 is finished. Then the process returns to step 210.

As a result of the processing of steps 224 to 246, while an image file representing a moving image selected by the user is replayed at the LCD 50, information relating to zooming conditions during execution of dubbing and/or playback on a subsequent occasion is recorded.

Thus, with the digital camera 10 relating to the present embodiment, because the zoom button 30C, which is operated at a time of zooming during photography, is also used as an operation portion for specifying zooming conditions for when dubbing or playback is executed, these settings can be carried out by operations that are the same as when photography is being carried out. Thus, usability is extremely good.

Meanwhile, if the determination in step 224 is negative, the process advances to step 248, and it is determined whether or not the magnification rate of the image being replayed on the LCD 50 at this point in time is greater than 1. If this determination is positive, the process advances to step 250, and it is determined whether or not the cross-cursor button 30B is being operated. If this determination is also positive, then the process advances to step 252.

In step 252, values of the processing region center coordinate variables are changed to coordinate values which have been moved by precisely a predetermined amount (one pixel in the present embodiment) in the direction indicated by the arrow key of the cross-cursor button 30B that has been pressed. Then, the process returns to step 210. When the values of the processing region center coordinate variables have been changed by the processing of step 252, playback images thereafter are replayed in a state in which the playback images are scrolled such that the image position represented by the processing region center coordinate variables coincides with the center position of the LCD 50.

However, if the determination of either of step 248 and step 250 is negative, then the process returns to step 210 without executing the processing of step 252.

Figure 8:
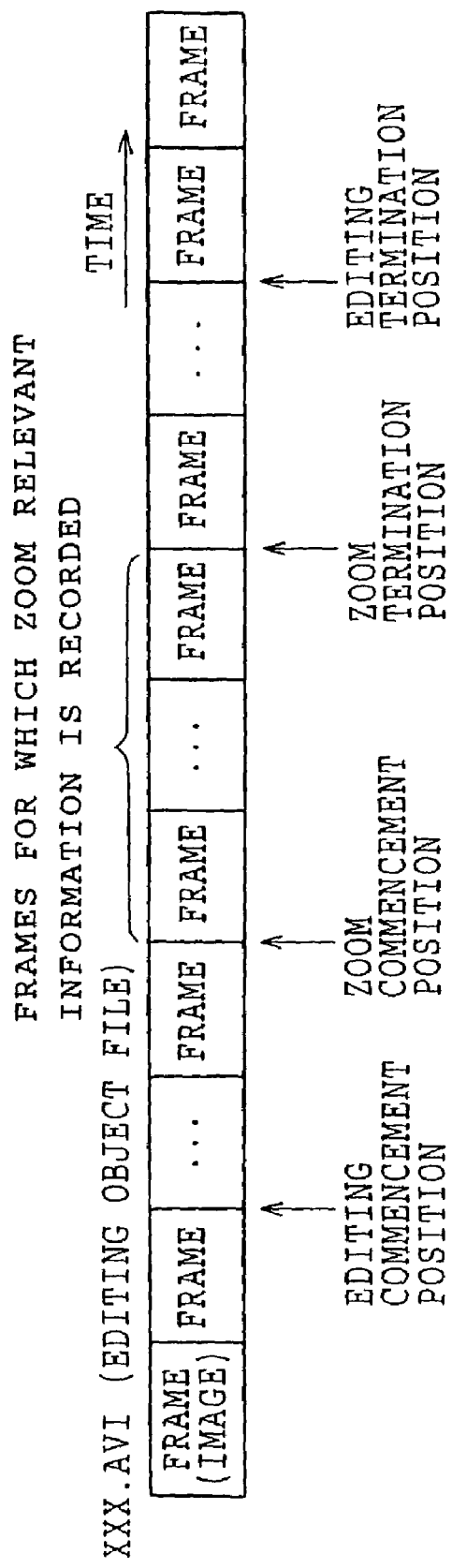
FIG. 8 is a diagram for explaining the editing file relating to the embodiment of the present invention.

Because of this image editing processing, in the state in which the editing object file is being replayed by the LCD 50, a user can record a frame number to the editing file as the editing commencement position information and record a frame number to the editing file as the editing termination position information, as shown in FIG. 8, while referring to the images that are being replayed. The user can record the editing commencement position information by fully pressing the release button 30A when the image that is to commence execution when dubbing or subsequent playback is executed is being replayed, and can record the editing termination position information by fully pressing the release button 30A again when the image that is to finish that execution is being replayed.

Further, with this image editing processing, in the state in which the editing object file is being replayed by the LCD 50, the user can record a frame number to the editing file as zoom commencement position information and record a frame number to the editing file as zoom termination position information, while referring to the images that are being replayed. The user can record the zoom commencement position information by pushing to operate the zoom button 30C when an image at which execution of zooming is to commence when dubbing or subsequent playback is executed is being replayed, and can record the zoom termination position information by finishing the pushing operation of the zoom button 30C when an image at which the execution of zooming is to finish is being replayed.

Hence, for each image that is replayed at the LCD 50 during pushing operation of the zoom button 30C, frame information representing that image, zoom rate information representing a zoom ratio for that image, and trimming information representing processing region center coordinates for that image are each recorded at the editing file as zoom relevant information.

The processing of steps 214, 218, 226, 240 and 244 in this image editing processing program corresponds to the information recording section of the present invention. The processing of steps 230 and 232 corresponds to the limiting section of the present invention.

Figure 9:
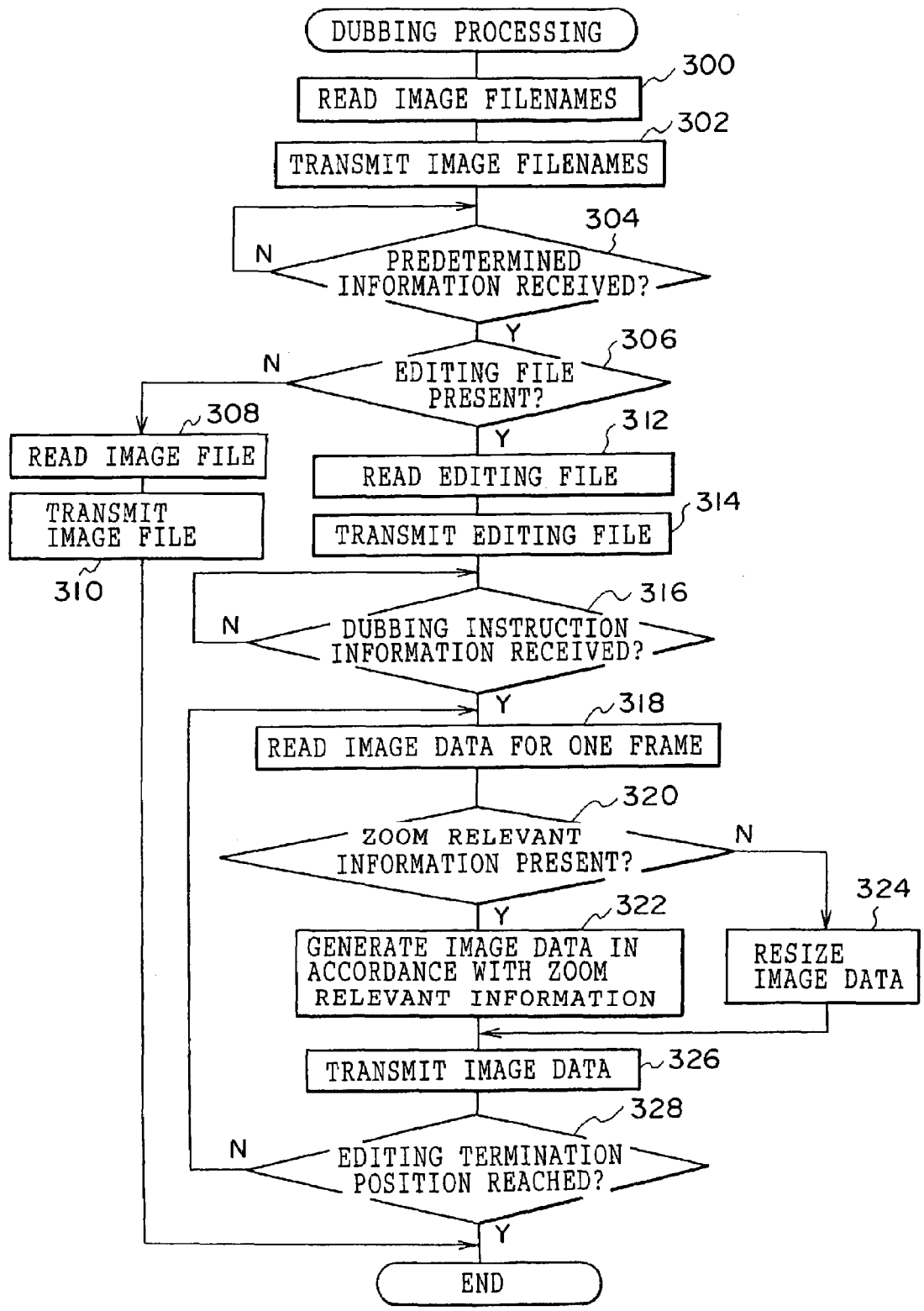
FIG. 9 is a flowchart showing process flow of a dubbing processing program relating to the embodiment of the present invention.

Next, a dubbing process that is executed by the digital camera 10 will be described with reference to FIG. 9. FIG. 9 is a flowchart showing process flow of a dubbing processing program which is executed by the CPU 28 of the digital camera 10 when the digital camera 10 is connected with external apparatus (herein, the PC 80) via the cradle 60, and instruction information that instructs execution of the dubbing process has been transmitted from the PC 80. This program is stored in advance at a predetermined region of the flash memory 24.

In step 300 of FIG. 9, the filenames of all image files recorded at the data recording region 26F are read from the directory 26D of the recording media 26. In a next step 302, information representing the filenames that have been read for all the image files is transmitted through the cradle 60 to the PC 80. In a next step 304, the process waits for transmission of predetermined information from the PC 80.

When the information representing the filenames is transmitted from the digital camera 10, the PC 80 utilizes the filename information that has been received to display a dubbing image selection menu, whose layout structure has been specified in advance, at the display section 84.

FIG. 10 shows the dubbing image selection menu that is displayed at the display section 84. As shown in FIG. 10, the dubbing image selection menu relating to the present embodiment displays a message prompting designation of a filename of an image file to be dubbed, and displays the image file filenames represented by the information received from the digital camera 10, in the form of a list.

When this dubbing image selection menu is displayed at the display section 84, a user, using an unillustrated keyboard, mouse or the like, designates the filename of an image file for which dubbing is desired from the filenames that are displayed. Accordingly, the PC 80 transmits information representing the filename designated by the user through the cradle 60 to the digital camera 10. Consequently, the determination of step 304 becomes positive, and the process advances to step 306.

In step 306, it is determined whether or not an editing file corresponding to the image file (below referred to as "dubbing object file") indicated by the information representing the filename that is transmitted from the PC 80 is present at the editing file recording region 26E of the recording media 26. If this determination is negative, the process advances to step 308 and the dubbing object file is read from the data recording region 26F of the recording media 26. In a next step 310, the dubbing object file that has been read out is transmitted through the cradle 60 to the PC 80, after which this dubbing processing program ends. By the processing of steps 306 to 310, when an image file for which an editing file does not exist is designated as the file to be dubbed, the whole of the designated image file is transmitted to the PC 80.

When the PC 80 receives the dubbing object file from the digital camera 10, the PC 80 records (dubs) the image file to a predetermined recording region of the external media 82, which has been loaded at the PC 80 in advance.

However, if the determination of step 306 is positive, that is, if an editing file corresponding to the dubbing object file is present, the process advances to step 312 and this editing file is read from the editing file recording region 26E of the recording media 26. In a next step 314, the editing file that has been read is transmitted to the PC 80.

When the PC 80 receives the editing file, the PC 80 reads out all the information that is included in the editing file, and transmits dubbing instruction information to the digital camera 10. The dubbing instruction information is instruction information which requests the transmission of digital image data corresponding to each image (frame) from the image indicated by the editing commencement position information that is included in the information that has been read to the image indicated by the editing termination position information. Further, if the editing file that has been received includes zooming position information and zoom relevant information, then this information is included in the dubbing instruction information that the PC 80 transmits to the digital camera 10.

Accordingly, in a next step 316, the process waits for reception of the dubbing instruction information from the PC 80. In a next step 318, digital image data corresponding to a first image in an image block that is to be transmitted to the PC 80 (in FIG. 8, the block of images (frames) from the editing commencement position to the editing termination position), as indicated by the dubbing instruction information that is received, is read out from the dubbing object file.

In a next step 320, it is determined whether or not zoom relevant data that relates to the digital image data read out in step 318 is present in the dubbing instruction information that was received in step 316. If this determination is positive, the process advances to step 322 and digital image data based on the digital image data that was read out in step 318 is generated in accordance with the zoom relevant information whose presence was detected in step 320. Thereafter, the process advances to step 326. Below, a procedure for the generation of digital image data in step 322 is described.

First, for the image represented by the digital image data read out in step 318, in a case in which a zoom ratio represented by zoom rate information, which is included in the zoom relevant information whose presence was detected in step 320, is magnified or diminished, digital image data of an image region that is to be included in the size of the image after dubbing (VGA size in the present embodiment) is cut out from the digital image data that was read out in step 318, with a position represented by trimming information which is included in the zoom relevant information at the center thereof.

Then, thinning out of pixels (resizing) in accordance with the magnification rate represented by the zoom rate information included in the zoom relevant information is carried out on the digital image data that has been cut out. Thus, digital image data is generated in accordance with the zoom relevant information. If the magnification rate is 1, then the thinning out of pixels may be carried out in the same way as the thinning out described above with reference to FIG. 7A. If the magnification rate is less than 1, that is, if the image is diminished, the thinning out of pixels may be carried out in the same way as the thinning out described with reference to FIG. 7B. Further, if the magnification rate is greater than 1 and not more than the magnification rate upper limit value C, the thinning out of pixels may be carried out in the same way as the thinning out described with reference to FIG. 7C.

On the other hand, if the determination in step 320 is negative, then the process advances to step 324. The image represented by the digital image data read out in step 318 is resized to the size of the dubbed image (VGA size in the present embodiment) by performing a thinning out process similar to the thinning out described with reference to FIG. 7A on the digital image data. Thereafter, the process advances to step 326.

In step 326, the resized digital image data obtained by the above processing is transmitted to the PC 80. In a next step 328, it is determined whether or not the processing of steps 318 to 326 has been completed for all the images of the aforementioned image block. If this determination is negative, the process returns to step 318. At a time when this determination becomes positive, the dubbing processing program ends.

When execution of the processing of steps 318 to 328 is repeated, in step 318, digital image data corresponding to the next image in the image block after the digital image data that was read out in the previous cycle is read out.

At the PC 80, the digital image data that is transmitted from the digital camera 10 by the processings of step 326 is sequentially stored at an unillustrated memory. At a time when transmission of the digital image data corresponding to all of the images in the image block has been completed, the digital image data that has been stored at the memory is collected together and recorded to a predetermined region of the external media 82 as a single moving image image file.

As a result of this dubbing processing, when an image file that has been subjected to editing by the above-described image editing processing is dubbed, an image file that is obtained by the dubbing can be made to be a file that accords with contents of the editing by the image editing process.

Figure 11:
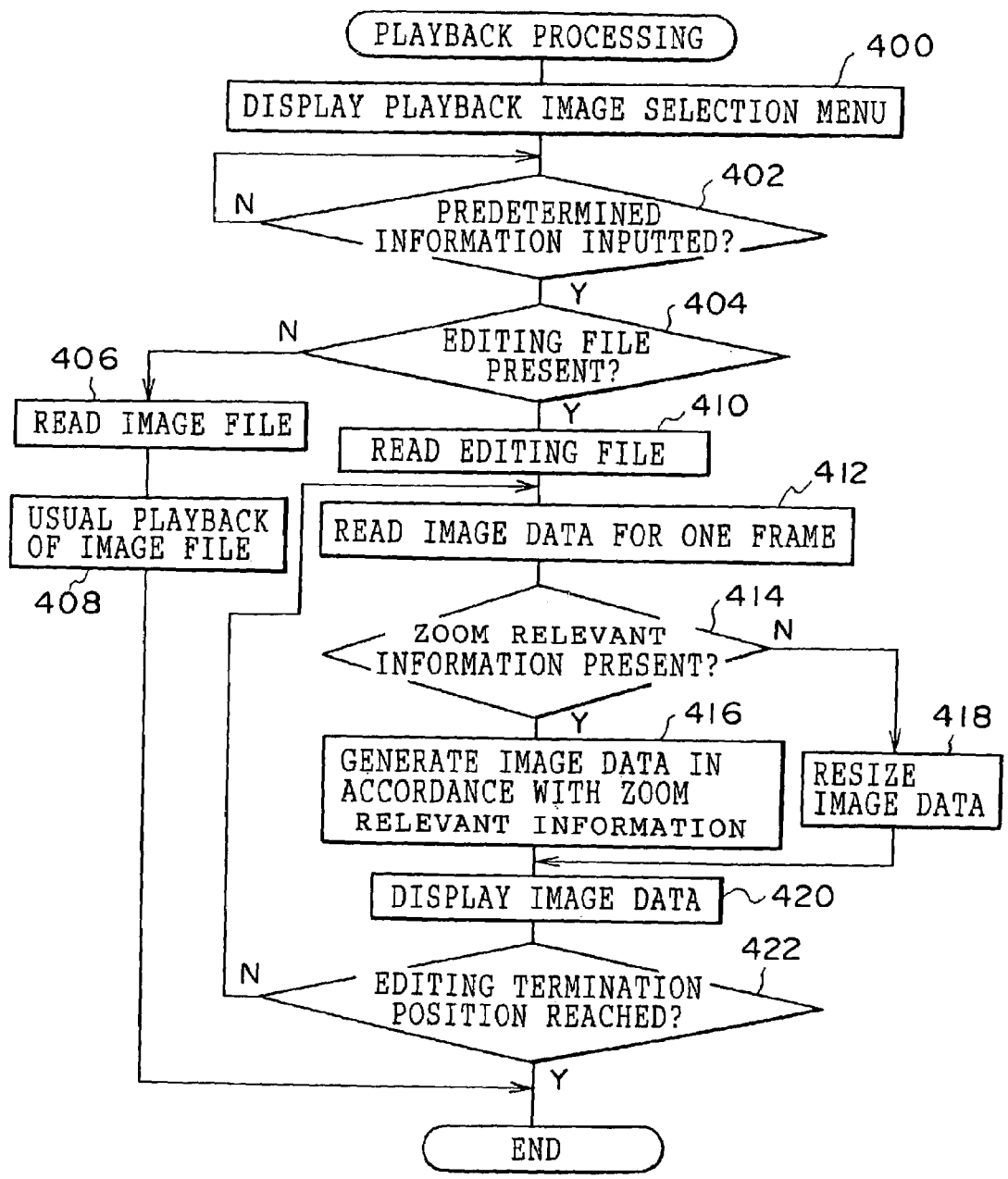
FIG. 11 is a flowchart showing process flow of a playback processing program relating to the embodiment of the present invention.

Next, playback processing that is executed by the digital camera 10 will be described with reference to FIG. 11. FIG. 11 is a flowchart showing process flow of a playback processing program which is executed by the CPU 28 of the digital camera 10 when a user specifies the playback mode by operation of the playback switch 30D. This program is stored in advance at a predetermined region of the flash memory 24. Herein, a case in which a plurality of moving image image files are recorded at the data recording region 26F of the recording media 26 will be described.

In step 400 of FIG. 11, the filenames of all the image files recorded at the data recording region 26F are read from the directory 26D of the recording media 26. The filenames that have been read for all the image files are utilized to display a playback image selection menu, whose layout structure has been specified in advance, at the LCD 50. In a next step 402, the process waits for input of predetermined information by a user.

FIG. 12 shows the playback image selection menu that is displayed at the LCD 50 by the processing step 400. As shown in FIG. 12, the playback image selection menu relating to the present embodiment displays a message prompting designation of a filename of an image file to be replayed, and displays the filenames read from the directory 26D in list form.

When this playback image selection menu is displayed at the LCD 50, the user, by operation of the cross-cursor button 30B, selects a filename corresponding to an image file for which playback is desired from the filenames that are displayed. Consequently, the determination of step 402 becomes positive, and the process advances to step 404.

In step 404, it is determined whether or not an editing file corresponding to the image file (below referred to as "playback object file") designated by the user is present at the editing file recording region 26E of the recording media 26. If this determination is negative, the process advances to step 406 and the playback object file is read from the data recording region 26F of the recording media 26. In a next step 408, the playback object file that is read out is replayed in an ordinary manner, after which this playback processing program ends. By the processing of steps 404 to 408, when an image file for which an editing file does not exist is designated by the user as the file to be replayed, the designated image file is replayed in a usual manner.

On the other hand, if the determination of step 404 is positive, that is, if there is an editing file corresponding to the playback object file, the process advances to step 410 and this editing file is read from the editing file recording region 26E of the recording media 26.

In a next step 412, digital image data corresponding to a first image in an image block, from the image indicated by the editing commencement position information included in the editing file that has been read to the image indicated by the editing termination position information (in FIG. 8, the block of images (frames) from the editing commencement position to the editing termination position), is read out from the playback object file.

In a next step 414, it is determined whether or not zoom relevant data that relates to the digital image data read out in step 412 is present in the editing file that was read out in step 410. If this determination is positive, the process advances to step 416 and digital image data based on the digital image data that was read out in step 412 is generated in accordance with the zoom relevant information whose presence was detected in step 414. Thereafter, the process advances to step 420. Below, a procedure for the generation of digital image data in step 416 is described.

First, for the image represented by the digital image data read out in step 412, in a case in which a zoom ratio represented by zoom rate information, which is included in the zoom relevant information whose presence was detected in step 414, is magnified or diminished, digital image data of an image region that is to be included in the size of the image during playback (VGA size in the present embodiment) is cut out from the digital image data that was read out in step 412, with a position represented by trimming information which is included in the zoom relevant information at the center thereof.

Then, thinning out of pixels (resizing) in accordance with the magnification rate represented by the zoom rate information included in the zoom relevant information is carried out on the digital image data that has been cut out. Thus, digital image data is generated in accordance with the zoom relevant information. If the magnification rate is 1, then the thinning out of pixels may be carried out in the same way as the thinning out described above with reference to FIG. 7A. If the magnification rate is less than 1, that is, if the image is diminished, the thinning out of pixels may be carried out in the same way as the thinning out described with reference to FIG. 7B. Further, if the magnification rate is greater than 1 and not more than the magnification rate upper limit value C, the thinning out of pixels may be carried out in the same way as the thinning out described with reference to FIG. 7C.

On the other hand, if the determination in step 414 is negative, then the process advances to step 418. The image represented by the digital image data read out in step 412 is resized to the size of the playback image (VGA size in the present embodiment) by performing a thinning out process similar to the thinning out described with reference to FIG. 7A on the digital image data. Thereafter, the process advances to step 420.

In step 420, the resized digital image data obtained by the above processing is displayed at the LCD 50. In a next step 422, it is determined whether or not the processing of steps 412 to 420 has been completed for all the images of the aforementioned image block. If this determination is negative, the process returns to step 412. At a time when this determination becomes positive, the playback processing program ends.

When execution of the processing of steps 412 to 422 is repeated, in step 412, digital image data corresponding to the next image in the image block after the digital image data that was read out in the previous cycle is read out. Further, when execution of the processing of steps 412 to 422 is repeated, a period of image display in step 420 is specified such that a rate of playback is the same as a rate of moving image photography when the playback object file was recorded to the recording media 26 (30 frames/second in the present embodiment).

As a result of this playback processing, when an image file that has been subjected to editing by the above-described image editing processing is replayed by the LCD 50, playback conditions can be made to accord with contents of the editing by the image editing processing.

As is explained in detail above, in the digital camera 10 relating to the present embodiment, pixel numbers in each of a horizontal direction and a vertical direction of an image represented by digital image data generated by the CCD 16 are greater than an image for which electronic zooming has been implemented. Furthermore, when display at the LCD 50 of an image represented by an image file or a copy of an image file is to be executed, a zoom ratio of electronic zoom that is applied to the image is limited to no more than the magnification rate upper limit value C, which is determined on the basis of the pixel numbers in each of the horizontal direction and the vertical direction of the image represented by the digital image data generated by the CCD 16 and the pixel numbers in each of the horizontal direction and the vertical direction of the image to which electronic zooming has been applied. Therefore, the required digital image data can be generated without interpolation processing being performed. As a result, a deterioration in quality of an image display with this digital image data can be avoided.

Further, in the digital camera 10 relating to the present embodiment, in a state in which a moving image represented by the image file is being displayed by the LCD 50, if electronic zoom is to be applied to the moving image when dubbing of the image file and/or playback of the moving image by the LCD 50 on a subsequent occasion is executed, zoom position information which represents positions in the image file of images for which execution of electronic zoom is desired, and zoom rate information which represents zoom rates for those images, are recorded on the basis of operations of the zoom button 30C, which is operated when the images for which execution of electronic zoom is desired are displayed by the LCD 50. In addition, in the state in which the moving images are being displayed by the LCD 50, editing commencement position information, which represents a position in the image file of an image at which commencement of execution of at least one of dubbing of the image file and subsequent display of playback images by the LCD 50 is desired, and editing termination position information, which represents a position in the image file of an image at which termination of that execution is desired, are recorded on the basis of operations of the release button 30A, which is operated when the image with which commencement of the execution is desired is displayed by the LCD 50 and when the image with which termination of the execution is desired is displayed by the LCD 50. Thus, one or both of dubbing and display, accompanied by electronic zooming, of a block which is a portion of a moving image image file can be carried out in a short time with simple operations.

Further still, with the digital camera 10 relating to the present embodiment, when digital image data corresponding to each image in an image file, from the image indicated by the editing commencement position information to the image indicated by the editing termination position information, is transmitted to an external section, at least one of dubbing of the image file and display of images represented by the image file can be executed at the external section.

Further again, with the digital camera 10 relating to the present embodiment, because the release button 30A is also used as the editing operation section of the present invention, operability can be improved and costs can be reduced.

Further yet, with the digital camera 10 relating to the present embodiment, because the zoom button 30C is also used as the zoom information input section, operability can be improved and costs can be reduced.

Moreover, with the digital camera 10 relating to the present embodiment, when dubbing of an image file is executed, zoom region image information, which is image data for a region that is to be magnified or diminished by a zoom rate in accordance with digital image information, is cut out from the digital image information, and the magnification or diminution is carried out on the zoom region image information that has been cut out. Thus, a processing load on an external device when dubbing of the image file is carried out at the external device can be reduced.

For the present embodiment, a case in which an image file that has been recorded at the recording media 26 by imaging at the digital camera 10 is dubbed to the external media 82 loaded at the PC 80 via the cradle 60 has been described. However, the present invention is not limited thus. For example, as shown in FIG. 13, embodiments are also possible in which the digital camera 10 is directly connected to an external storage device 92, such as a hard disk device, a DVD drive device, a CD-R drive device or the like, and the digital camera 10 dubs directly to a recording medium provided at the external storage device 92. In such a case, the same effects as in the present embodiment can be achieved.

Further, for the present embodiment, a case has been described in which various kinds of editing information, such as the editing commencement positioning information, editing termination position information, zoom position information, zoom rate information and the like, are recorded as an editing file. However, the present invention is not limited thus. For example, embodiments are also possible in which such information is recorded as tags in an image file that is the object of editing. In such a case, there is no need to provide the editing file recording region 26E at the recording media 26. Again, the same effects as in the present embodiment can be achieved.

Further again, for the present embodiment, a case has been described in which information such as the editing commencement position information, editing termination position information, zoom commencement position information and zoom termination position information is recorded as frame numbers of images at corresponding positions in the image file. However, the present invention is not limited thus. For example, embodiments are also possible in which such information is recorded as time durations from a playback start time when the image file is replayed from a first image. In such a case too, the same effects as in the present embodiment can be achieved.

Further still, for the present embodiment, a case has been described in which zoom rate information is employed as ratio information of the present invention. However, the present invention is not limited thus. For example, embodiments are also possible in which, instead of the trimming information relating to the present embodiment, information representing coordinates of four corner points of the image that is obtained by magnification or diminution at the ratio represented by the zoom rate information, or information representing coordinates of two corner points on a diagonal of that image or the like is employed, and this information serves as the ratio information of the present invention. In such a case, there is no need to have recorded the zoom rate information. Again, the same effects as in the present embodiment can be achieved.

Further yet, for the present embodiment, a case in which the digital camera 10 and the external apparatus are connected using USB has been described. However, the present invention is not limited thus. Connection can also be embodied by a cable communication system other than USB (for example, IEEE 1394 or the like), by wireless communication (for example, BLUETOOTH, IrDA or the like), and the like. In such cases, the same effects as in the present embodiment can be achieved.

Further yet again, for the present embodiment, a case in which electronic zoom processing is carried out on moving images has been described. However, the present invention is not limited thus. Obviously, embodiments which carry out electronic zoom processing on still images are also possible. In such cases, instead of the image editing processing relating to the present embodiment, image editing processing is employed which, in a state in which a still image represented by an image file that is the target of processing is displayed at the LCD 50, sets a zoom rate by operation of the zoom button 30C and records zoom rate information representing the specified zoom rate to an editing file. In such cases too, at least one of duplication and display, accompanied by electronic zoom, of the image file of the still image can be carried out by simple operations in a short time.

Still further, for the present embodiment, a case in which the magnification rate upper limit value C shown by equation (1) is employed as the magnification rate upper limit value of the present invention has been described. However, the present invention is not limited thus. In cases such as a case in which performing pixel interpolation processing to a slight degree does not have a great effect on the quality of the image after electronic zoom processing, because the pixel numbers of the image after electronic zoom processing are comparatively large, or the like, the magnification rate upper limit value of the present invention may be set to a value slightly larger than the magnification rate upper limit value C (for example, a value 25% larger than the magnification rate upper limit value C). In such cases, the magnification rate that is permitted for electronic zooming is larger, and a degree of freedom of magnification by electronic zoom can be increased.

Yet further, for the present embodiment, a case in which, in the image editing processing (see FIGS. 5A and 5B), information such as editing position information, zoom position information and zoom relevant information is recorded directly to the recording media 26 when a user operates various buttons and the like has been described. However, the present invention is not limited thus. For example, embodiments are also possible in which, when the user operates the various buttons and the like, such information is temporarily stored at the SDRAM 22 or the flash memory 24, and is thereafter recorded at the recording media 26 in accordance with an instruction from the user requesting that the information be recorded to the recording media 26. In such a case too, the same effects as in the present embodiment can be achieved.

Still further again, for the present embodiment, a case has been described in which, in the image editing processing, operations are carried out to input various information that is to be recorded in an editing file in a state in which a moving image that is the subject of processing is being replayed at a real-time playback speed. However, the present invention is not limited thus. For example, embodiments are also possible in which these operations are carried out in a state in which frame-by-frame playback of the processing subject, frame-by-frame rewinding playback or the like is being carried out. In such cases, positions of desired images can be designated with higher accuracy than in the present embodiment.

Yet further again, for the present embodiment, nothing has been stated with regard to updating the image file. However, obviously, such updating can be performed. That is, there are cases in which an image file for which an editing file already exists is again subjected to image editing processing. In such a case, information such as editing position information, zooming position information and zoom relevant information, which is inputted in accordance with operations by the user during the image editing processing, is written over a recording region corresponding to the previously created editing file. Consequently, in such a case, when dubbing processing (see FIG. 9) or playback processing (see FIG. 11) is executed, the updated editing information is preferentially used.

Furthermore, the process flows of the processing programs described in the present embodiment (see FIGS. 5A, 5B, 9 and 11) are examples. Obviously, suitable variations thereof are possible within a scope that does not depart from the spirit of the present invention.

What is claimed is:

1. An information recording device comprising:
   an imaging section which captures an image and generates image information;
   a recording section which records the image information generated by the imaging section;
   a display section which displays an image represented by the image information recorded at the recording section;
   a zoom information input section which, when electronic zoom is to be applied to the image during execution of at least one of duplication of the image information and display of the image information by the display section, inputs zoom information including at least ratio information representing a zoom rate of the electronic zoom; and
   a limiting section which limits such that pixel numbers in each of a horizontal direction and a vertical direction of an image represented by the image information generated by the imaging section are greater than pixel numbers in the horizontal direction and the vertical direction of an image to which the electronic zoom has been applied, and such that the zoom ratio is not more than a magnification rate upper limit value, the magnification rate upper limit value being determined on the basis of the pixel numbers in the horizontal direction and the vertical direction of the image represented by the image information generated by the imaging section and the pixel numbers in the horizontal direction and the vertical direction of the image to which the electronic zoom has been applied.

2. The information recording device of claim 1, wherein the image comprises a moving image, and the zoom information input section comprises:
   an editing operation section which inputs the zoom information by being operated during a time in which the moving image is being displayed by the display section, the zoom information being input for an image that is currently being displayed at the display section and for which the electronic zoom is to be applied at a time of execution of at least one of (i) duplication of the image information and (ii) display of the moving image by the display section on an occasion subsequent to the current displaying,
   the editing operation section also being operated during a time in which the moving image is being displayed by the display portion to input editing execution information, the editing execution information being input for (a) an image that is currently being displayed by the display section and for which editing is to be commenced at the time of execution of at least one of (i) duplication of the image information and (ii) display of the moving image by the display section on an occasion subsequent to the current displaying, and (b) for an image that is subsequently being displayed at the display section and for which the editing is to be terminated; and
   an information recording section which, on the basis of operation of the zoom information input section, records zoom position information indicating a position in the image information of the image at which the electronic zoom is to be applied and ratio information representing a zoom rate for that image, and which, on the basis of operation of the editing operation section, records editing commencement position information indicating a position in the image information of the image at which the execution of the editing is to be commenced and editing termination position information indicating a position in the image information of the image at which the execution of the editing is to be terminated.

3. The information recording device of claim 2, further comprising a transmission section which, of the image information, transmits image information corresponding to each image from the image indicated by the editing commencement position information to the image indicated by the editing termination position information outside the device.

4. The information recording device of claim 3, further comprising a photographic zoom operation portion which, during execution of capture of the image by the imaging section, is operated when an image which is represented by the image information obtained by this capturing is to be magnified or diminished, wherein the zoom information input section and the photographic zoom operation portion are used in common.

5. The information recording device of claim 3, further comprising a photography operation portion which is operated when the imaging section is to capture an image, wherein the editing operation section and the photography operation portion are used in common.

6. The information recording device of claim 3, further comprising:
   a cutting out section which, during execution of duplication of the image information, cuts out zoom region image information from the image information, the zoom region image information comprising image information of a region that is to be magnified or diminished by a zoom rate corresponding thereto; and
   a zoom execution section which carries out magnification or diminution on the zoom region image information at the corresponding zoom rate.

7. The information recording device of claim 3, wherein transmissions from the transmission section comprise wireless transmissions.

8. The information recording device of claim 7, wherein the wireless transmissions comprise at least one of transmissions by electromagnetic waves and transmissions by infra-red rays.

9. The information recording device of claim 3, wherein transmissions from the transmission section comprise transmissions by cable, and the transmissions by cable comprise at least one of transmissions according to USB standard and transmissions according to IEEE 1394 standard.

10. The information recording device of claim 2, further comprising a photographic zoom operation portion which, during execution of capture of the image by the imaging section, is operated when an image which is represented by the image information obtained by this capturing is to be magnified or diminished, wherein the zoom information input section and the photographic zoom operation portion are used in common.

11. The information recording device of claim 2, further comprising a photography operation portion which is operated when the imaging section is to capture an image, wherein the editing operation section and the photography operation portion are used in common.

12. The information recording device of claim 2, further comprising:
   a cutting out section which, during execution of duplication of the image information, cuts out zoom region image information from the image information, the zoom region image information comprising image information of a region that is to be magnified or diminished by a zoom rate corresponding thereto; and
   a zoom execution section which carries out magnification or diminution on the zoom region image information at the corresponding zoom rate.

13. The information recording device of claim 2, wherein the zoom information input section comprises at least one of a switch and a button that is operable by at least one of pushing operation, sliding operation and tilting operation, and a contact sensor inside thereof.

14. The information recording device of claim 2, wherein the editing operation section comprises at least one of a switch and a button that is operable by at least one of pushing operation, sliding operation and tilting operation, and a contact sensor inside thereof.

15. The information recording device of claim 1, further comprising a photographic zoom operation portion which, during execution of capture of the image by the imaging section, is operated when an image which is represented by the image information obtained by this capturing is to be magnified or diminished, wherein the zoom information input section and the photographic zoom operation portion are used in common.

16. The information recording device of claim 1, further comprising:
   a cutting out section which, during execution of duplication of the image information, cuts out zoom region image information from the image information, the zoom region image information comprising image information of a region that is to be magnified or diminished by a zoom rate corresponding thereto; and
   a zoom execution section which carries out magnification or diminution on the zoom region image information at the corresponding zoom rate.

* * * * *